United States Patent [19]
Andreou

[11] Patent Number: 5,591,947
[45] Date of Patent: Jan. 7, 1997

[54] METHOD AND APPARATUS FOR LASER ISOTOPE SEPARATION

[75] Inventor: Doros Andreou, Strovolos, Cyprus

[73] Assignee: Synergetic Resiurces Limited, Douglas, Isle of Man

[21] Appl. No.: 307,718

[22] PCT Filed: Mar. 26, 1992

[86] PCT No.: PCT/GB92/00552
§ 371 Date: Sep. 21, 1994
§ 102(e) Date: Sep. 21, 1994

[87] PCT Pub. No.: WO93/18844
PCT Pub. Date: Sep. 30, 1993

[51] Int. Cl.$^6$ .................................................. B01D 5/00
[52] U.S. Cl. ................. 204/157.22; 422/186.03; 250/423 P
[58] Field of Search ............. 204/157.22; 422/186.03; 250/423 P

[56] References Cited

U.S. PATENT DOCUMENTS

| | | |
|---|---|---|
| 4,107,536 | 8/1978 | St. Peters . |
| 4,302,305 | 11/1981 | Kaldor et al. . |
| 4,786,478 | 11/1988 | Ahmed et al. ............. 422/186.03 |
| 4,944,573 | 7/1990 | Michon . |
| 4,946,567 | 8/1990 | Michon et al. . |

FOREIGN PATENT DOCUMENTS

| | | |
|---|---|---|
| 10357148 | 3/1990 | European Pat. Off. . |
| 12627995 | 1/1977 | Germany . |
| 22810791 | 1/1980 | Germany . |

OTHER PUBLICATIONS

"Spectral Dependence of Excitation of High Vibrational Levels in a Uranium Hexaflouride Molecule", Alimpiev et al, Chemical Abstracts, vol. 97, No. 24, Dec. 13, 1982, p. 493.

"Uranium Hexaflouride Photodissociation Through Measurement of Visible and Infrared Luminescence", Oyama et al., Chemical Abstracts, vol. 105, No. 8, Aug. 25, 1986, p. 619.

Primary Examiner—Ngoclan Mai
Attorney, Agent, or Firm—Ostrolenk, Faber, Gerb & Soffen, LLP

[57] ABSTRACT

A simple system for obtaining high dissociation yield in a single highly selective step, even at very high pumping powers, in the molecular laser isotope separation (MLIS) route of Uranium Hexaflouride ($UF_6$), is described. In order to selectively excite and dissociate the desired isotope $^{235}UF_6$ two beams with frequencies corresponding to the first and second energy excitation levels of this isotope at $\omega_1 = \omega_0$ and $\omega_2 = \omega_0 + \omega_{12}$ respectively where $\omega_{12}$ is the frequency difference between the first and second energy excitation levels, are simultaneously applied to the supercooled Uranium Hexafluoride molecular gas. Special arrangements which involve the perpendicular crossing of two sets of such beams derivable from the same set of collinear beams polarized in the same direction, allow for the supercooled gas to be uniformly illuminated in configurations equivalent to a Mach-Zehnder interferometer with the gas substituted for the position of the reuniting beam-splitter further enhancing the selectivity of the desired isotope. The versatility of the method enables it to be applied to any particular molecular gas with closely spaced isotopes.

20 Claims, 7 Drawing Sheets

Raman scattering

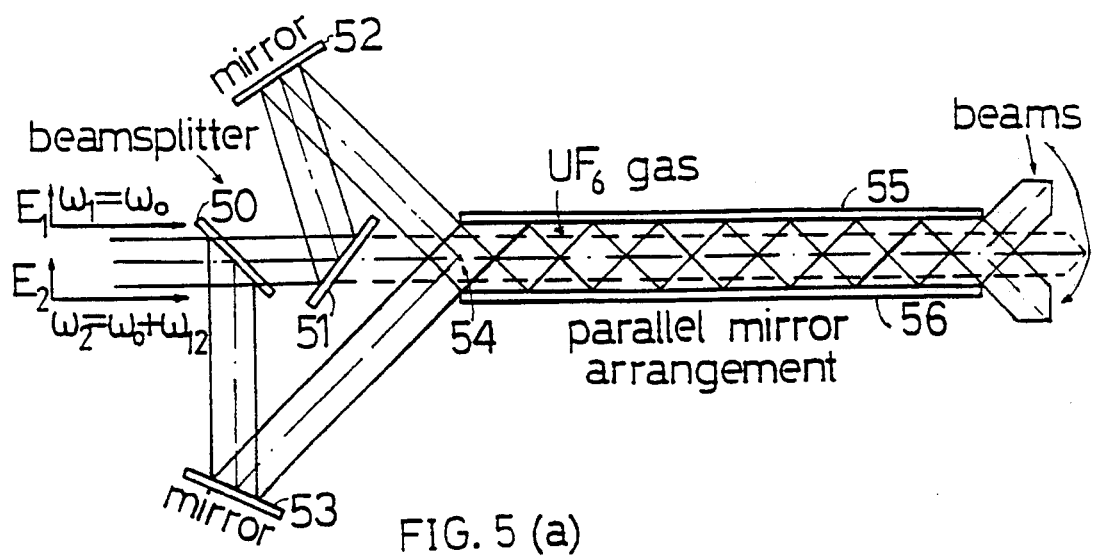
FIG. 5(a)
FIG. 5(b)
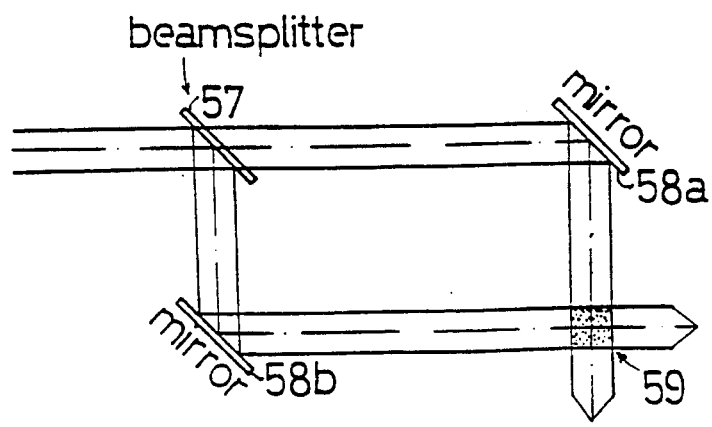

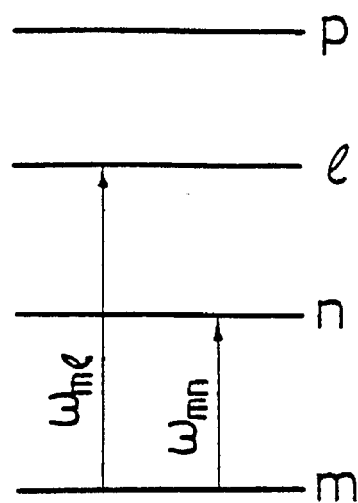
FIG. 7(a)
FIG. 7(b)
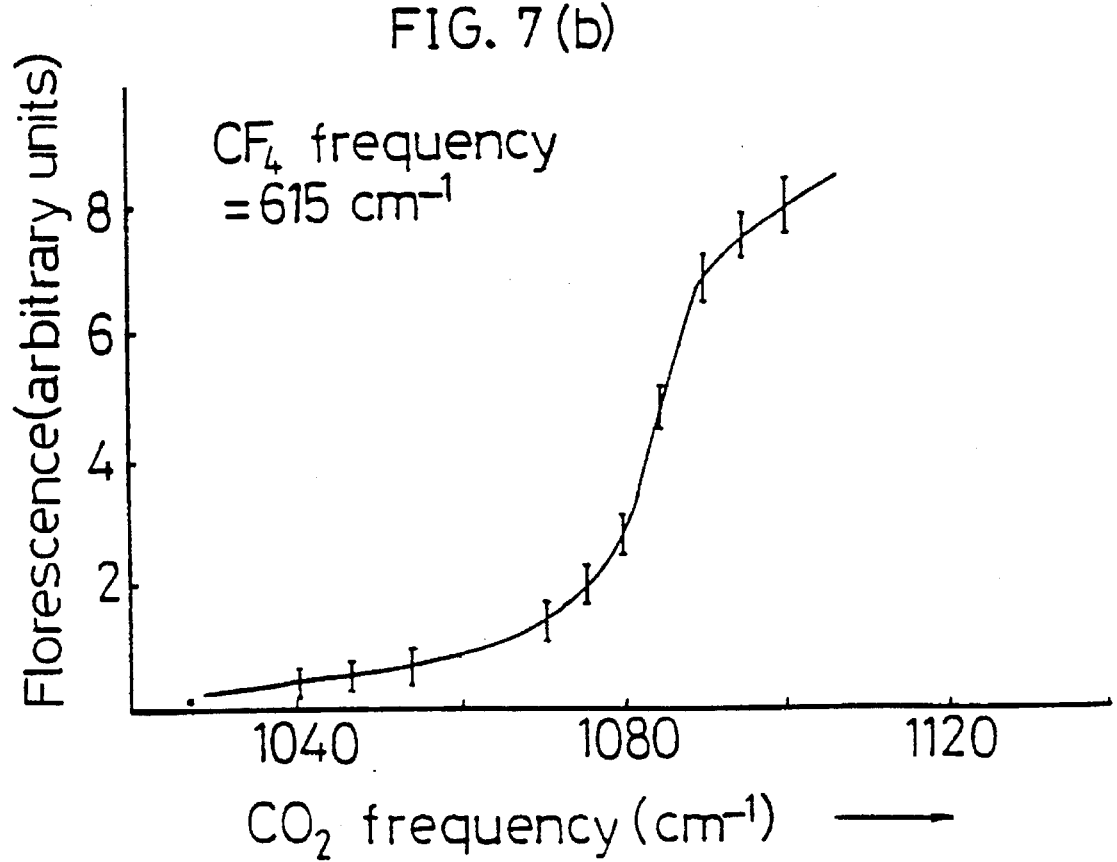

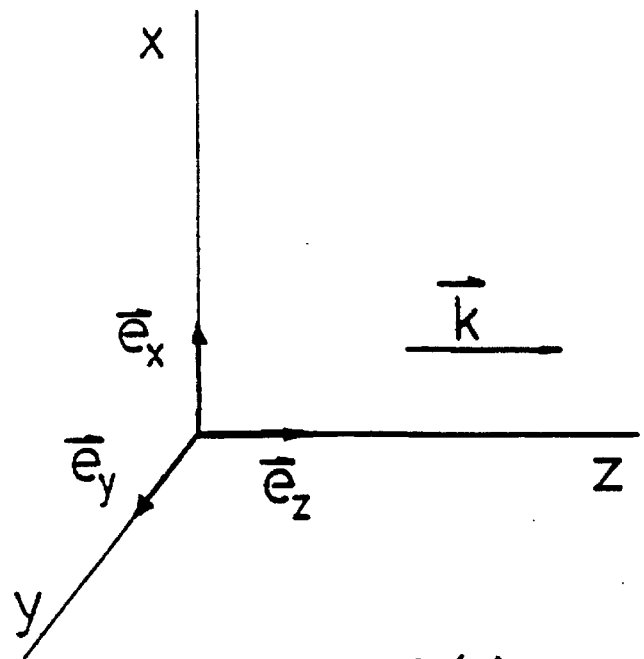
FIG. 9(a)
FIG. 9(b)
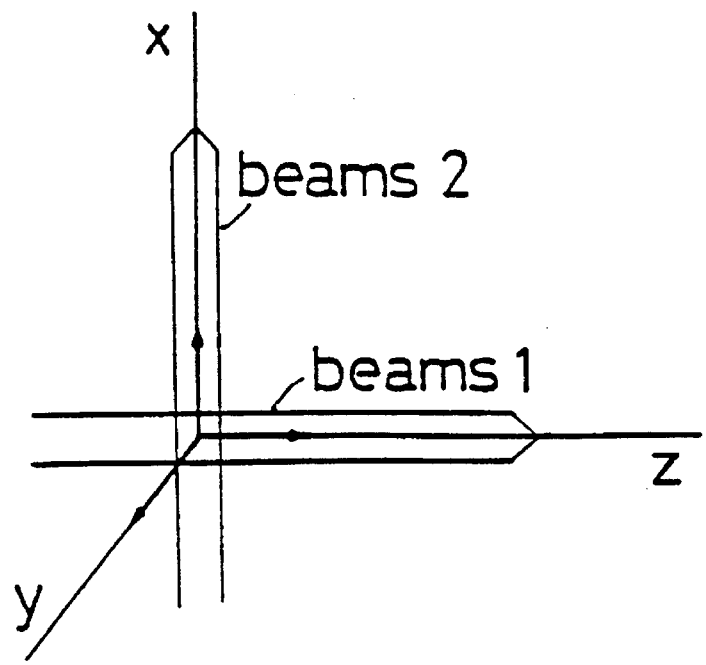

METHOD AND APPARATUS FOR LASER ISOTOPE SEPARATION

The discovery of a method and the invention of a system for obtaining high selectivity with very high dissociation yield in the Molecular Laser Isotope Separation (MLIS) route of Uranium Hexafluoride ($UF_6$) are described. The system described here will improve the efficiency (by greatly increasing the selectivity and dissociation yield) and minimize the capital and maintenance costs of the molecular laser isotope separation method by enormous factors.

It had generally been accepted in the past that for a commercial separation plant the Uranium Hexafluoride ($UF_6$) is the most attractive gas for the enrichment of Uranium and the Molecular Laser Isotope Separation (MLIS) is the most desirable process. The technoeconomics of the molecular route (MLIS) for commercially separating the $UF_6$ isotopes can be grouped into two main areas: (i) The performance of the laser systems and their capital and maintenance cost; (ii) The efficient use of photons in the selectivity and dissociation process.

In the past it has been estimated that the capital and maintenance cost of the laser systems would amount for half of the total expenditure (e.g. Los Alamos Science report on isotope separation 1982). My parallel International patent application based CB 9111310.0 describes an extremely simple laser system which fulfils all the technological requirements for the MLIS method in terms of efficiency, performance and output characteristics, and in addition its capital and maintenance costs are extremely small. This very simple laser system could make the MLIS method more efficient than the AVLIS method on its own.

The second area concerning the commercial realization of the MLIS method is the efficiency of the process of interaction which has hitherto run into certain problems because of the poor selectivity obtained between the $UF_6$ isotopes when high laser pumping powers are used. A method for obtaining high dissociation yield in a single highly selective step in the Molecular Laser Isotope Separation (MLIS) process is embodied in the present invention and it is described with reference to FIGS. 1–9:

BRIEF DESCRIPTION OF THE DRAWINGS

FIG. 5a shows an arrangement for $^{235}UF_6$ large dissociation yield in a single highly selective step and FIG. 5b depicts the equivalence of the Mach-Zehnder interferometer principle to the arrangement of FIG. 5a with the molecular gas placed in the position of the reuniting beamsplitter.

FIG. 7a shows a vibrational ladder with $\omega_{mn}+\omega_{nl}=\omega_{ml}$ and FIG. 7b shows the experimental dependence of the two frequency dissociation yield (=fluorescence) on the $CO_2$ frequency $\omega_2$.

FIG. 9a shows the unit vectors involved in the equations of evaluating the induced magnetic (M1) and the electric (E2) dipoles, z being the direction of propagation of the interacting electromagnetic field, and FIG. 9b is a schematic diagram showing the perpendicular crossing of two identical sets of beams, which have been derived from the same initial set of beams, with the molecular gas (harmonic oscillators) placed at their intersection under resonant conditions.

DESCRIPTION OF THE INVENTION

Figure 1:
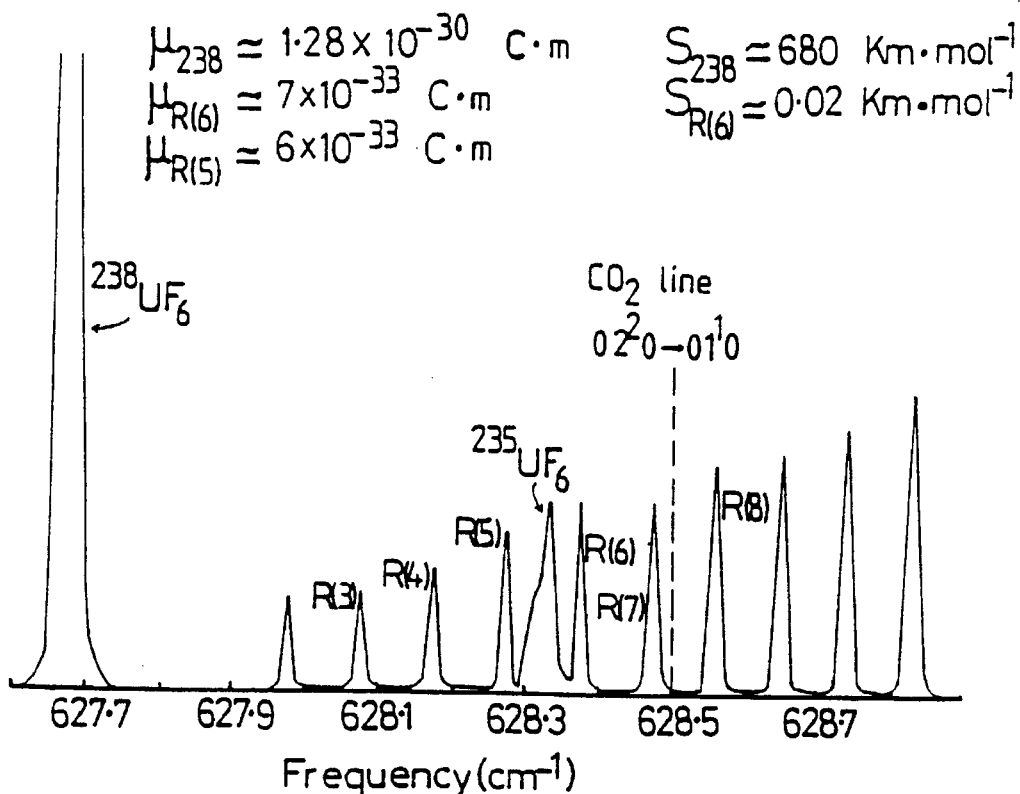
FIG. 1 shows the spectrum of the expansion supercooled $UF_6$ molecular gas enriched to 3% in $^{235}UF_6$.

In order to separate $^{235}UF_6$ from $^{238}UF_6$, use is made of the slight difference in the infrared absorption spectra of the $\nu_3$ vibrational mode at 628.32 cm$^{-1}$. Expansion supercooling of the $UF_6$ gas enables the absorption bands in this region to be dinstinct and clear. FIG. 1 shows the complete detailed spectrum of an expansion supercooled $UF_6$ gas which has already been enriched to 3% in $^{235}UF_6$ ($\mu_{238}$ is the vibrational dipole moment of $^{238}UF_6$, $\mu_{R(6)}$ and $\mu_{R(5)}$ are the dipole moments of the R(6) and R(5) rotational lines respectively, $S_{238}$ is the vibrational band strength of the $^{238}UF_6$ and $S_{R(6)}$ is the line strength of the R(6) line). At higher resolution, which can be obtained with a tunable diode laser, hyperfine structure can also be resolved. The difference in the absorption bands of $^{238}UF_6$ and $^{235}UF_6$ is seen to be 0.63 cm$^{-1}$, and the ratio of the Q-branch peak heights for a sample containing the natural mixture of Uranium isotopes (0.7% in $^{235}UF_6$) is about 140 to 1. It can be seen from the constants in the figure that the rotational levels of the R-branch of $^{238}UF_6$ which surround the absorption band of $^{235}UF_6$ and which could inhibit selectivity have dipole moments which are nearly three orders of magnitude less than that of the main $UF_6$ band, and line strengths which are much smaller than the line strengths of the main bands. The main problem is thus the separation of $^{238}UF_6$ and $^{235}UF_6$ using the difference in their respective absorption bands at 627.69 cm$^{-1}$ and 628.32 cm$^{-1}$. Experiments to date have indicated that when low laser pumping powers are used to excite the $^{235}UF_6$ absorption band (under 5 mJ in –50 ns), excellent selectivity and enrichment of the $^{235}UF_6$ have been obtained. When higher powers, however, were used, the selectivity became poorer. This is attributed to power broadening of the spectral lines under irradiation by powerful beams. Again, because of their small dipole moments, the power broadening (to a first approximation the power broadening of a spectral line can be shown to be $-[\Delta\nu_o^2+(4\mu^2|E_o|^2/\hbar^2)]^{1/2}$ where $\mu$ is the dipole moment of the transition and the electric field of the laser beam is $E_o$) of the rotational R lines does not affect the selectivity. Even under pumping powers of $2\times10^6$ W/cm$^2$ (100 mJ/cm$^2$ in –50 ns), the power broadening of the rotational R lines has been calculated to be less than 0.015 cm$^{-1}$, thus not affecting the selectivity of the $^{235}UF_6$ band (FIG. 1). At the same power levels (100 mJ/cm$^2$ in ~50 ns) however, the power broadening of the main $^{238}UF_6$ band has been calculated to be more than 1 cm$^{-1}$. This result clearly indicates (see FIG. 1) why selectivity is lost at high pumping powers. Other calculations have indicated that for good selectivity to be preserved, the maximum power of the selecting laser must be less than $2\times10^5$ $^W$/cm$^2$ (10 mJ/cm$^2$ in ~50 ns). This limiting input energy can be increased somewhat by lengthening the pulse duration and thus keeping the power constant, provided it is not long enough for collisional effects to become significant. Up to these power levels, the full width of the power broadening of the main $^{238}UF_6$ band is less than 0.35 cm$^{-1}$ (0.18 cm$^{-1}$ half width) and as it can be seen from FIG. 1 the selecting laser will only be exciting the $^{235}UF_6$ band at 628.32 cm$^{-1}$ (it is well below the separation of the isotopes). These power levels are also compatible with the hitherto obtained experimental results. It is evident, however, that power broadening becomes one of the factors which cause selectivity to deteriorate at very high pumping power levels (over 100 mJ/cm$^2$ in 40 ns). Preserving selectivity at high pumping powers is very important in the commercial realization of MLIS because good selectivity and large dissociation yield of $^{235}UF_6$ in a single step are highly desirable in order to keep the capital and maintenance costs low. It is precisely good selectivity with large dissociation yield in a single step (higher pumping powers) which the present discovery and invention enables to be obtained.

The main process used for the selective dissociation of polyatomic molecules is an effect known as multiple photon dissociation which is the result of the absorption under collisionless conditions, of many infrared photons of the same frequency by a single molecule by exciting successively higher vibrational states of the molecule until its dissociation is reached. The phenomenon is as yet not fully explained but the main problem in understanding the effect lies in the way in which the molecules are driven through the mesh of the energy states to the dissociation limit. For Uranium Hexafluoride ($UF_6$) the molecule must be driven through the energy levels to the dissociation energy of ~3 eV (~24000 cm$^{-1}$). It follows from the known experimental results, however, that the main difficulty in attaining selective dissociation in polyatomic molecules lies in the way in which they are driven through the initial few vibrational states. The following experimental analysis proves the point:

(a) Diatomic molecules do not dissociate. Some triatomic molecules like OCS and $O_3$ dissociate when irradiated with very intense infrared radiation. Lighter polyatomic molecules in general require more input energy for dissociation than heavy polyatomic molecules. Polyatomic molecules dissociate very easily. Compare these experimental results with the fact that there is a profound difference between the density of states in a diatomic molecule and the density of states in a polyatomic molecule, as can be seen from FIG. 2 where the density of vibrational states for various molecules as a function of vibrational energy is plotted. We see immediately that for polyatomic molecules where the density of states at high energy levels is very big, once they are excited through the initial energy states it is easy for them to reach dissociation because from there on, there is an abundance of states to climb through and precise matching of the total energy of a number of photons with a particular level is easy to achieve. On the contrary for lighter molecules even if they are excited through the first few energy states it is still difficult to proceed because the density of states higher up is still very small and precise matching of the energy of a number of photons with a particular level is still difficult to achieve.

(b) When two infrared frequencies are used near the absorption of one isotopic species, dissociation is still much easier for the heavier molecules than for the lighter ones. Since the frequencies of the two beams can be tuned to match the lower energy levels of the molecules in both cases, it follows that it is the density of states in the higher levels which make all the difference in the dissociation of the heavier molecules.

(c) Some form of isotopic selective absorption occurs even in cases of highly overlapping spectra such as room-temperature $UF_6$ gas. In fact under two frequency irradiation, small selective decomposition of $UF_6$ at room temperature has been observed. Since at the higher energy levels the density of states is so enormous (FIG. 2) it follows that the selectivity occurs in the matching of the radiation to the lower energy levels, as in this case higher energy levels always exist which match the total energy of groups of photons.

(d) In two step photodissociation experiments (a process in which an infrared photon excites a vibrational state of a molecule and an ultraviolet photon dissociates the excited molecule), the threshold frequency for ultraviolet dissociation shifts more and more to the red as the infrared fluence increases. These relatively large shifts clearly indicate that the infrared laser is exciting the molecules to higher and higher vibrational states as the infrared fluence increases and therefore the ease with which the molecules are driven through the lower vibrational states is the main factor in the multiple photon absorption effect.

(e) A number of experiments claim to have demonstrated bond selective reactions or at least some degree of vibrational energy localization within a polyatomic molecule, i.e. that the vibrational energy remained in a single normal mode and cleaved the chemical bond that experienced the highest vibrational amplitude. The arguments for bond selective dissociation rely heavily on many features of the classical picture for the absorption of infrared radiation. This energy localization and bond selective dissociation could only occur in the lower vibrational levels since the higher vibrational levels consist of a quasicontinuum and continuum of mixed highly interacting states and therefore matching of the total energy of groups of photons to any of these levels is easy.

(f) For small molecules the absorption cross-section decreases with increasing fluence whilst for large molecules the absorption cross-section remains constant with increasing fluence. This is evidence that the density of states in the higher levels (FIG. 2) is the basic factor determining the multiple photon absorption between the two cases, and that for polyatomic molecules the basic problem in selectivity and dissociation is the way in which the molecules are driven through the lower vibrational levels.

(g) For lighter molecules such as $SF_6$ (the molecule most studied in multiple photon dissociation), the absorption cross-section drops quickly with increasing fluence at 300° K. but drops less quickly at 500° K. This is due to the degree of initial vibrational excitation in the molecule because most $SF_6$ molecules are not excited at 300° K. whereas most are excited at 500° K. With heavier molecules there is little loss of cross-section with increasing fluence because even at 300° K. virtually all molecules have some degree of vibrational excitation. This, further indicates that the absorption through the lower vibrational states is the main factor determining multiple photon dissociation.

Figure 2:
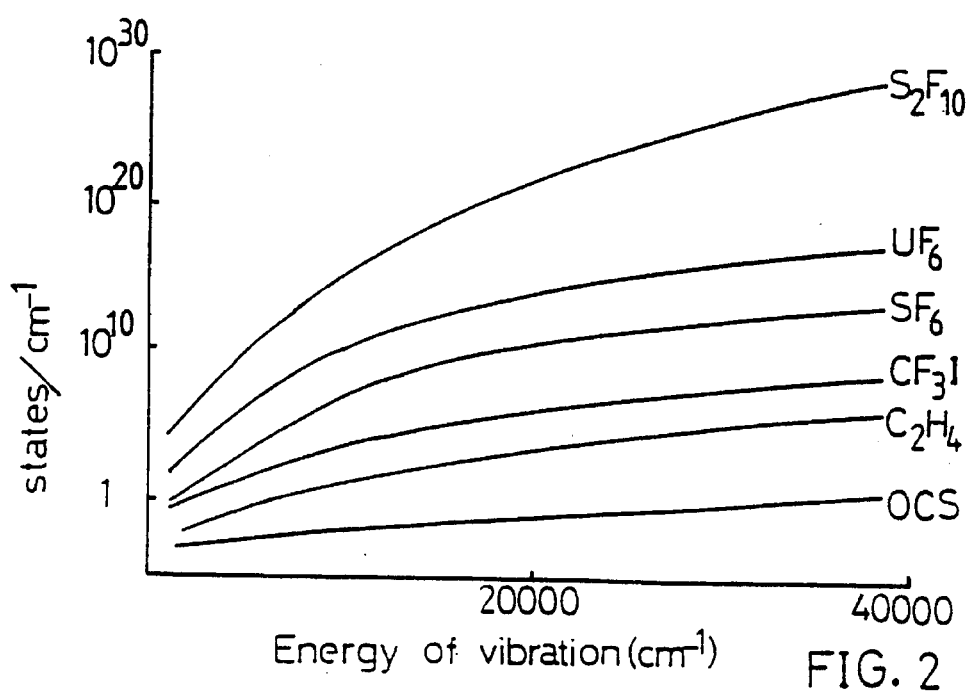
FIG. 2 shows the density of the vibrational states of various polyatomic molecules as a function of vibrational energy.

It is evident from the above analysis of the experimental results that the main factor in determining the selectivity and dissociation of polyatomic molecules lies in the way in which the molecules are driven through the lower vibrational states and the density of states in the higher vibrational levels. Subsequently, the major practical aspects affecting the selectivity and dissociation process in polyatomic molecules depend on the ease with which the molecules are driven through the lower vibrational levels up to the quasicontinuum, provided there is matching of the total energy of a certain number of photons with the energy of a higher vibrational level of the molecule. In the case of polyatomic molecules, the latter condition is nearly always matched because of the enormous density of states in the higher vibrational levels (FIG. 2). From this point onwards the excitation of the molecule through the quasicontinuum and continuum of mixed energy levels is straightforward and does not present any difficulty.

Having established the domain which must be tackled to achieve better selectivity and dissociation, we turn now to the interaction of radiation with molecular oscillators. The harmonic or anharmonic oscillator models have often been used to describe the molecular interaction with electromagnetic radiation. A molecule absorbs infrared radiation by interaction of its vibrating electric dipole with the oscillating electromagnetic field of the radiation. Molecular vibration is quantized and absorption is usually treated as a match between the energy of the photons being absorbed and the gap between the energy levels involved in the transitions. In classical electrodynamics, it can be shown that when powerful electromagnetic radiation interacts with a harmonic or anharmonic oscillator its vibration (and therefore its absorption or emission characteristics) consists of all the harmonics (and the summation and beat frequencies and all their combinations in the case when the incident beam contains two frequencies) in addition to the fundamental vibration. When any of these harmonic oscillations is near resonance the magnitude of the cross-section of the effect described by that particular vibration is amplified enormously. Thus in the case when powerful electromagnetic radiation hits an oscillator it would be more appropriate to treat absorption as a match between the dipole moments produced in the molecule by any resonant oscillating fundamental or harmonic frequency (or resonant combination frequency) with the allowable quantized levels of the molecular vibration. In a classical analysis, the ways in which the various components of the induced moments vibrate in the molecule is the result of the expansion of the higher order terms in the electric field. It is the resonance conditions of the different components of the vibration corresponding to the induced dipole moments which become the dominant factors in the absorption cross-section of the molecule, and tunnel the energy from the electromagnetic field into the molecule.

In the classical electromagnetic treatment of the interaction, the molecular gas can be considered as consisting of N harmonic oscillators per unit volume (or N anharmonic oscillators if we are interested in the interaction with the complete vibrational ladder up to and above the quasicontinuum of vibrational states), each oscillator representing one molecule (extensive analysis of Raman scattering using this model exists in the literature). Each oscillator is characterized by its position r and the normal vibrational coordinate $X(r,t)$. The equation of motion of a single oscillator of mass m and natural frequency of oscillation $\omega_o$ is $$\frac{d^2 X(r,t)}{dt} + \Gamma \frac{dX}{dt} + \omega_o^2 X = \frac{F(r,t)}{m} \tag{1}$$

This equation (or variations of it to accommodate anharmonic terms) is the one commonly used to describe the interaction of molecular oscillators with radiation. There are however two observations which must be made if this equation is to be analysed in terms of pure classical electrodynamics. The Born-Oppenheimer approximation assumes that the electrons produce a potential in which the nuclei vibrate, and as a result of the very large mass difference between the electrons and the nuclei it is valid to treat electronic and nuclear motions as independent. Because the negative charge of the electrons and the positive charge of the nuclei are spatially separated, it is possible to establish or change an electric dipole moment in the molecule by displacement of any charged particle from its equilibrium position. Thus there is an actual physical displacement of the effective dipole when it is irradiated by powerful electromagnetic radiation. It is the vibration of this effective motion which can be analysed in terms of classical electrodynamics by perturbation analysis in ascending powers of the electric field to produce a qualitative description of the nonlinear phenomena. When the wavelength of the radiation is much longer than the physical size of the oscillator, we can therefore consider the oscillator to be situated on average at r=O and analyse the vibrations of the effective motion of the dipole by classical electrodynamics. The second remark that must be pointed out is the derivation of the driving force $F(r,t)$ in equation (1) acting on the oscillator which has always been derived from the electrostatic energy stored in the molecule. This derivation however produces oversimplified results. It has always been overlooked that since there is actual physical displacement of the effective dipole (as pointed out above in the Born-Oppenheimer approximation) due to the action of the powerful electromagnetic field there will be higher order terms in the electric field originating from the force function $F(r,t)$ giving coherent contributions to the different vibrations of the molecule. For powerful beams these contributions give large increases at resonance to the absorption (or scattering) cross-sections of the different spectral components of the oscillator. Under these conditions, the equation of motion of the oscillator which is subjected to powerful electromagnetic radiation containing two frequencies $\omega_1$ and $\omega_2$ becomes $$\frac{d^2 r}{dt^2} + \Gamma \frac{dr}{dt} + \omega_o^2 r = \sum_\alpha \frac{F^{(\alpha)}(r,t)}{m} \tag{2}$$

where the origin is taken at the mean position at which the oscillator is vibrating and $\alpha$ takes the values 1 and 2, $\Gamma$ being the frictional term as in equation (1) closely related to the spontaneous linewidth. If we are only interested in the interaction with the lower vibrational levels of the molecule (and from the previous experimental analysis this is the interesting region from the practical point of view), equation (2) suffices and gives a fair picture, but for the higher levels in the vibrational ladder to be taken into account anharmonic terms will have to be included. The complete classical electrodynamic analysis of equation (2) is outside the scope of the present article but the results indicate that the oscillation consists of the complete spectrum of the harmonics of each frequency in addition to the summation and beat frequencies and all their combinations. The most interesting results occur when one of the frequencies is near resonance where it can be seen that resonant denominators in the higher order terms in the electric field give significant coherent contributions to the absorption cross-section of the fundamental as well as to the absorption cross-section of its second harmonic. Under scrutinized analysis of the terms producing the induced dipole moments in the molecule a most important case is revealed, which is of particular interest to the present invention. It occurs when one of the frequencies is at resonance ($\omega_1 = \omega_o$) and the other frequency is equal to twice the natural frequency i.e. at the second harmonic of the first frequency ($\omega_2=2\omega_o$). In this case doubly resonant terms in the second order terms in the electric field enhance the absorption cross-section of the molecule at $\omega_1=\omega_o$ by enormous factors and in addition the molecule becomes highly absorbant at $\omega_2=2\omega_o$. The frictional term in the infrared in equation (2) is approximately $\Gamma=2\pi\Delta\nu$, where $\Delta\nu$ is the natural line-width of the transition, and the resonant denominators are determined by the powers of $1/(\Gamma/\omega_o)$ where $\Gamma/\omega_o \sim 10^{-5}$. Thus in this particular case the absorption cross-section of the molecule at $\omega_1=\omega_o$ increases enormously due to the presence of the powerful beam at $\omega_2=2\omega_o$, and in addition the molecule becomes highly absorbant at $\omega_2=2\omega_o$. Thus when a molecule whose vibrational mode is close to a harmonic oscillator is subjected to two laser frequencies one at $\omega_1=\omega_o$ and the other at $\omega_2=2\omega_o$ the molecule absorbs radiation at $\omega_1=\omega_o$, at $\omega_2-\omega_1=2\omega_o-\omega_o=\omega_o$ due to the presence of $\omega_2 \simeq 2\omega_o$, and at $2\omega_o$.

All the above results were obtained on the basis of classical electrodynamics when considering the resonances occurring when a molecular oscillator is subjected to two simultaneous beams at $\omega_1=\omega_o$ and at $\omega_2=2\omega_o$. A closer examination of the terms producing the induced dipole moments for the main nonlinear absorption terms at $\omega_o=\omega_2-\omega_1=2\omega_o-\omega_o$ and at $2\omega_o$ indicates that not all of them are in the direction of their respective electric fields. In fact many of the strong components of the induced dipole moments (some of them are quadrupole moments) at $\omega_o=\omega_2-\omega_1 \simeq 2\omega_o-\omega_o$ and at $2\omega_o$ lie in the direction of propagation of the two exciting beams.

In order to underline the scientific principles in the process of interaction let us briefly return to the oscillator described by equation (2). When this oscillator of mass m and charge e is subjected to powerful electromagnetic radiation containing two frequencies with electric fields $E_1(\omega_1=\omega_o)$ and $E_2(\omega_2 \simeq 2\omega_o)$ with an angle $2\theta$ between their respective polarization vectors and where $\omega_o$ is the natural frequency of the oscillator, it oscillates in such a way as to induce dipole moments in different directions (some of them are quadrupole moments which attain high values at resonance). A perturbation analysis of equation (2) preserving terms up to the third order in the electric field results in the following terms inducing dipole moments in their respective directions ($\vec{e}^{(1)}$ is the unit vector in the direction of the respective electric field, $\vec{k}$ is the unit vector in the direction of propagation of the two beams and c is the velocity of light):

$$+A'_1 \vec{e}^{(1)} \left( \frac{e}{m\omega_o} \right) E_1(\omega_o) \frac{\omega_o}{(\Gamma/\omega_o)}$$

First order term ordinary absorption at $\omega_o$ $$+A'_2 \vec{\kappa} \frac{1}{2c} \left( \frac{e}{m\omega_o} \right)^2 E_1(\omega_o) E_2(2\omega_o) \frac{\omega_o \cos 2\theta}{(\Gamma/\omega_o)^2}$$

Second order term nonlinear absorption at $\omega_o = \omega_2 - \omega_1 \simeq 2\omega_o - \omega_o$ due to the presence of the beam at $2\omega_o$.

$$+A'_3 \vec{e}^{(1)} \frac{2\cos\delta}{c} \left( \frac{e}{m\omega_o} \right)^2 E_1^2(\omega_o) \frac{\omega_o}{(\Gamma/\omega_o)^2}$$

Second order term nonlinear absorption at $2\omega_o$ due to the intensity of the pumping beam at resonance $\omega_o$.

-continued $$+A'_4 [\vec{e}^{(1)} + \kappa(\cos\theta + \sin\theta)] \frac{1}{c^2} \left( \frac{e}{m\omega_o} \right)^3 E_1^2(\omega_o) E_2(2\omega_o) \frac{\omega_o \cos 2\theta}{(\Gamma/\omega_o)^3}$$

Third order term non-linear absorption as $2\omega_o$ due to the presence of the beam at $\omega_o$.

$$-A'_5 \vec{e}^{(1)} \frac{\cos\delta}{8c^2} \left( \frac{e}{m\omega_o} \right)^3 E_1^3(\omega_o) \frac{\omega_o}{(\Gamma/\omega_o)^3}$$

Third order term. This term corresponds to an optically induced transparency at $\omega_o$ hence the minus sign.

It can be seen that the main nonlinear absorption terms $A_2'$ and $A_4'$ are maximum when $\theta=0$ i.e. when the polarizations of the two beams are in the same direction and that these terms produce induced moments in the direction of propagation of the beams $\vec{k}$. The cos $\sigma$ factor is a function of the polarization angles amongst the various quantities taking part in the interaction process and the terms $A_3'$ and $A_5'$ are in general small. All the terms above are given in units of acceleration, $m/_s 2$. The numerical factors in front of the terms do not have an exact meaning and are only due to the method of calculation. In a quantum mechanical analysis these would be different by factors of 2, 4 etc. In general, scrutinized analysis of the second and third order terms in the electric field under doubly and triply resonant conditions producing terms in powers of $1/(\Gamma/\omega_2)$ indicate that nearly all nonlinear effects have a classical electrodynamic analog. In addition, no effect predicted in the classical electrodynamic analysis violates in any way the quantum mechanical selection rules (see experimental analogy with Raman Scattering later). The detailed analysis is however beyond the scope of the present application.

It can be seen from the above list of the induced moments in the molecule that the main nonlinear absorption terms $A_2'$ and $A_4'$ cause the molecules to also absorb radiation at $\omega_o=\omega_2-\omega_1 \simeq 2\omega_o-\omega_o$ and at $2\omega_o$ when they are irradiated with radiation whose electric fields at these frequencies lie in the direction of propagation of the two exciting beams. At high pumping powers of the exciting beams these terms acquire values which can be comparable to the linear absorption term $A_1'$. Subsequently it is evident from the $A_2'$ and $A_4'$ terms that a large increase in the absorption of the oscillators will occur if the interaction length of the molecular gas with the exciting beams at $\omega_o$ and $2\omega_o$ is simultaneously irradiated with beams also at $\omega_o$ and $2\omega_o$ in a transverse direction so that their electric fields are in the direction of propagation of the original exciting fields. One such way of producing an increased absorption with outstanding selectivity (see later on for precise explanation) would be to irradiate the molecular gas along its interaction length with the exciting beams, with additional transverse beams at $\omega_o$ and $2\omega_o$ so that their electric fields $E_1(\omega_o)$ and $E_2(2\omega_o)$ lie along the direction of propagation of the original exciting beams $\vec{k}$.

Figure 3A:
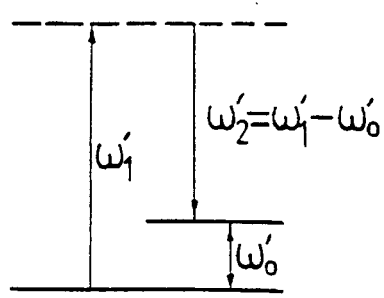
FIG. 3a shows the standard Raman scattering process and FIG. 3b shows the spectrum of the Stokes and Antistokes frequencies with the higher orders of Stokes radiation appearing simultaneously i.e. having approximately the same threshold.
Figure 3B:
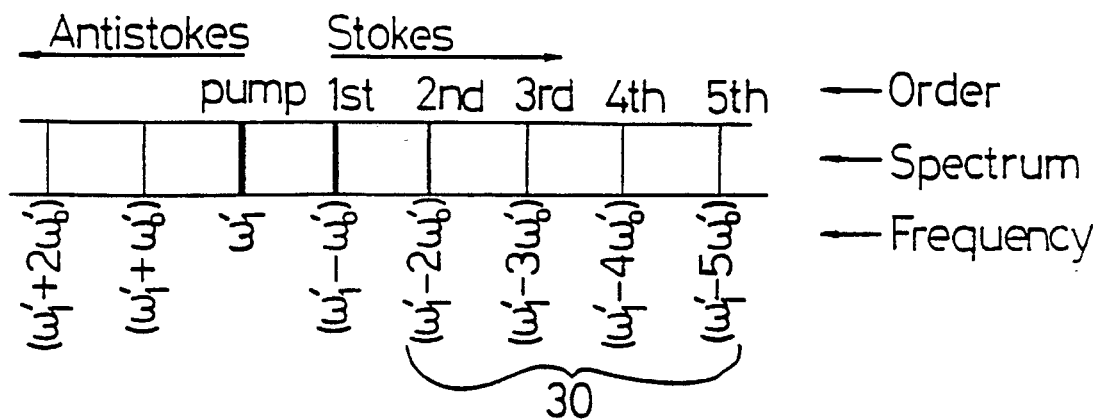

An analogous situation to the principle of the present invention arises during the generation of higher order Stokes frequencies in Raman scattering. In fact, an analysis of the generation of higher order Stokes radiation provides experimental evidence that the effect could be more general in nature: If the natural frequency of oscillation $\omega_o'$ of a molecular oscillator is excited by a laser beam with frequency $\omega_1'$ and the oscillator is simultaneously subjected to a second powerful beam with frequency $\omega_2'$ such that $\omega_1'-\omega_2'=\omega_o'$, the oscillator will vibrate strongly and scatter radiation at $\omega_1'-\omega_o'$, $\omega_1'-2\omega_o'$, $\omega_1'-3\omega_o'$, $\omega b_1'-4\omega_o'$ etc. FIG. 3a illustrates the standard case of a Raman oscillator which is subjected to a powerful beam at $\omega_1'$ generating a beam at the Stokes frequency $\omega_2'=\omega_1'-\omega_o'$ and a vibrational quantum $\omega_o'$. FIG. 3b shows the experimental spectrum obtained when a Raman medium is subjected to a powerful beam at $\omega_1'$ generating higher Stokes and antiStokes radiation. Stimulated Raman scattering at the first Stokes has a certain threshold power. It is an experimental result however that when the 1st Stokes beam reaches power levels which are comparable to those of the pumping beam, the higher order Stokes 2nd, 3rd, 4th etc (bracketed as 30 in FIG. 3b) appear simultaneously i.e. they have the same threshold. Thus when the threshold of the 2nd order Stokes is reached the 3rd, 4th, 5th etc Stokes frequencies appear at the same time with approximately the same threshold as the 2nd Stokes, all these orders shown bracketed as 30 in FIG. 3b. It is evident that the commonly held view that a particular higher order Stokes frequency appears when the previous one reaches a certain power threshold (in the same way as the case is between the pump and the first Stokes), is wrong in view of the experimental fact just described. What actually happens is that when the 1st Stokes frequency attains a power level of comparable magnitude to the exciting frequency, the excited molecular oscillators are automatically subjected to two powerful beams $\omega_1'$ and $\omega_2'$ such that $\omega_1'-\omega_2'=\omega_o'$ and the oscillator is forced to vibrate and scatter radiation at all the harmonic frequencies of the oscillator at $\omega_1'-\omega_o'$, $\omega_1'-2\omega_o'$, $\omega_1'-3\omega_o'$, $\omega_1'-4\omega_o'$ etc. This is the reason why the subsequent higher order Stokes have approximately the same threshold. One must also mention in support of experimental evidence that antiStokes radiation can never occur without the presence of a Stokes beam, and also that this radiation is not parallel to the exciting radiation. Thus, unless the Raman oscillator is simultaneously subjected to two beams, the exciting beam at $\omega_1'$ and the Stokes beam at $\omega_2'$ such that $\omega_1'-\omega_2'=\omega_o'$, there can be no antiStokes radiation. The above experimental facts in the case of Raman scattering were cited here in order to provide an actual experimental analogy to the principle of the present invention.

Recapitulating the results of classical electrodynamics with regard to isotope separation the following points elucidate the picture more:

(i) When a molecular oscillator is subjected to two laser frequencies one at $\omega_1=\omega_o$ and the other at $\omega_2 \approx 2\omega_o$ there are strong coherent contributions to the absorption cross section of the molecule at $\omega_o$ due to the absorption cross section at $\omega_2-\omega_1 \approx 2\omega_o-\omega_o=\omega_o$. Thus, the presence of $2\omega_o$ greatly enhances the absorption cross section at $\omega_o$. At the same time the molecule becomes highly absorbant at $2\omega_o$.

(ii) The absorption of the molecule at $\omega_2 \approx 2\omega_o$ is greatly increased because of the presence of the exciting frequency at $\omega_1=\omega_o$. There can be no significant absorption at $2\omega_o$ without excitation at $\omega_o$.

(iii) The main factors which contribute to absorption of the desired isotopic species are: Absorption at $\omega_1=\omega_o$, absorption due to the presence of $\omega_2 \approx 2\omega_o$ at $\omega_2-\omega_1 \approx 2\omega_o-\omega_o \approx \omega_o$, and absorption by the molecule at $\sim 2\omega_o$. These are the results of classical electrodynamics. The precise value of the frequency $\omega_2$ which must be applied in practice will be defined later from quantum mechanical considerations.

(iv) A molecular gas, which can be considered a close match to a harmonic oscillator, containing two closely spaced isotopic species can be selectively dissociated if a laser whose frequency is finely adjusted at $\omega_1=\omega_o$ simultaneously irradiates the gas with a powerful second beam at $\omega_2=2\omega_o$ (the two beams being polarized in the same direction for optimum performance). The unwanted isotopic species does not absorb at $2\omega_o$ because there is no resonance at $\omega_1=\omega_o$.

(v) In order to enhance even more the absorption and to obtain outstanding selectivity of the desired isotopic species another set of beams at the same frequencies $\omega_1=\omega_o$ and $\omega_2=2\omega_o$, derivable from the first one, is simultaneously applied to the molecular gas with their electric field vectors parallel to the direction of propagation of the original exciting pumping beams. The precise practical $\omega_2$ frequency will be defined later. Subsequently, all the induced moments are used for absorption and the molecules of the selected isotope absorb intensely at the frequencies corresponding to $\omega_1=\omega_o$, $\omega_2-\omega_1 \approx 2\omega_o-\omega_o \approx \omega_o$ and at $2\omega_o$.

Figure 8:
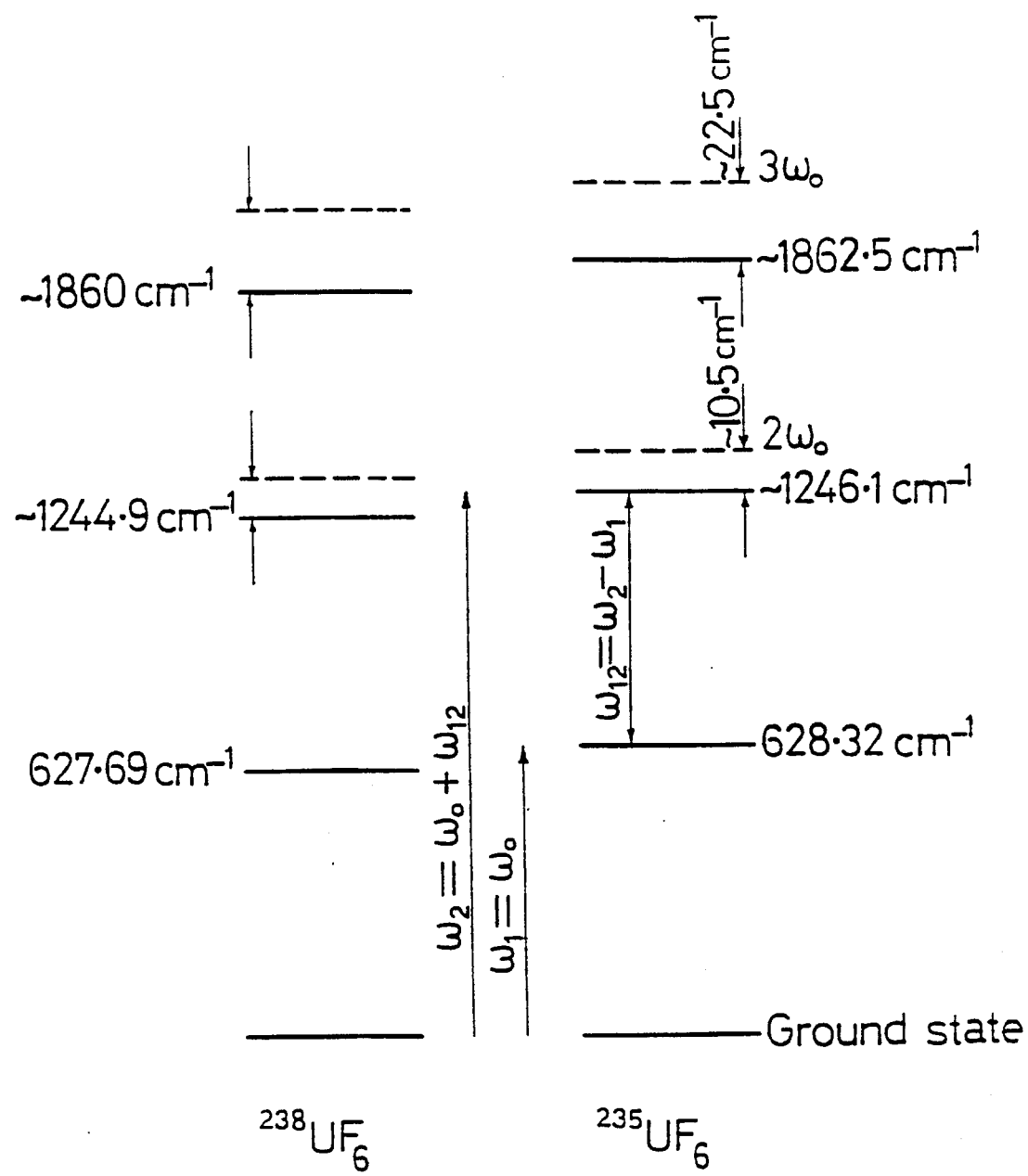
FIG. 8 shows how a $^{235}UF_6$ molecule will be excited through the lower vibrational levels and thereafter to dissociation by absorption of radiation at $\omega_1=\omega_0$, $\omega_2=\omega_0+\omega_{12}$ and $\omega_{12}=\omega_2-\omega_1$, when two frequencies $\omega_1$ and $\omega_2$ corresponding to the first and second energy excitation levels of the molecule are applied to the supercooled molecular gas.

The behaviour of a molecular oscillator when it is simultaneously subjected to two frequencies at $\omega_1=\omega_o$ and $\omega_2 \approx 2\omega_o$ where $\omega_o$ is the natural frequency of the oscillator, has been described. The results do not however give sufficient information as to the precise frequencies of the interaction, always producing results in multiples of the harmonic components. The nearest correction which can be made to the frequencies is the deviation from harmonicity due to the frictional force of the order of $(\Gamma 2/4\omega_o)$, and corrections due to the anharmonic potential well which for the lower levels are of lesser importance. These cannot give results approaching experimental conditions because of the complexity of the interacting forces in large molecules. Absorption of light by an atomic or molecular system occurs according to the energy spacings between the quantum levels of the system. These levels are not symmetrically spaced but they differ according to the molecular structure of the particular system. FIG. 8 shows the energy level diagram of a $UF_6$ molecule with the approximate deviations from harmonicity. Especially in the lowest vibrational levels where there are large differences between the classical and quantum spectroscopic parameters, a quantum theory approach is needed to define precisely the frequencies of interaction at which the previously predicted effects will occur. The results obtained from equation (2) came out of a completely general approach in classical electrodynamics. In the following, an entirely general approach based on standard quantum perturbation analysis is presented in order to investigate the behaviour of the quantum system and define precisely the frequencies of interaction.

Consider time-dependent perturbation theory where the Hamiltonian varies with time as $$H=H_o+H^1(t) \tag{3}$$

where $H_o$ is the unperturbed Hamiltonian satisfying $$H_o\phi_n=E_n\phi_n \tag{4}$$

If $\psi(t)$ is the solution to the Schrödinger equation $$H\psi(t) = i\hbar \frac{\partial \psi(t)}{\partial t} \tag{5}$$

then it can be expanded in terms of the complete orthonormal set of functions $\phi_n$ $$\psi(t) = \sum_n C_n(t)\, \phi_n \exp\left[ -\frac{iE_n t}{\hbar} \right] \tag{6}$$

where $C_n(t) \exp[-(iE_n t/\hbar)]$ are the coefficients of the expansion and if H'(t)=0 then $C_n(t)$ becomes constants. The general results of the time-dependant perturbation analysis are:

$$\dot{C}_k^{(0)} = 0 \tag{7}$$

$$\dot{C}_k^{(1)} = \frac{1}{i\hbar} \sum_n C_n^{(0)} H'_{kn}(t) e^{i\omega_{kn}t}$$

$$\dot{C}_k^{(2)} = \frac{1}{i\hbar} \sum_n C_n^{(1)} H'_{kn}(t) e^{i\omega_{kn}t}$$

$$\vdots \quad \vdots$$

$$\dot{C}_k^{(r)} = \frac{1}{i\hbar} \sum_n C_n^{(r-1)} H'_{kn}(t) e^{i\omega_{kn}t}$$

where the $C_k^{(o)}$ define the initial values of the problem and are chosen as $$C_m^{(o)}=1 \text{ and } C_n^{(o)}=0 \text{ for } n \neq m$$

so that the system is known with certainty to be in state m at time t=0. Thus for the case where the system is known with certainty to be in state m $$\dot{C}_k^{(1)} = \frac{1}{i\hbar} C_m^{(0)} H'_{km}(t) e^{i\omega_{kn}t} = \frac{1}{i\hbar} H'_{km}(t) e^{i\omega_{km}t} \tag{8}$$

where $|C_k^{(1)}|^2$ is the probability that between t=0 and t the system will make a transition to state k. For a harmonic perturbation of the form $$H'(t) = H' e^{i\omega t} + H'^* e^{-i\omega t} \quad t > 0 \tag{9}$$
$$H'(t) = 0 \quad t < 0$$

$C_k^{(1)}$ is easily calculated to be $$C_k^{(1)} = -\frac{1}{\hbar} \left\{ \frac{H'_{km}[e^{i(\omega_{km}+\omega)t}-1]}{(\omega_{km}+\omega)} + \frac{H'^*_{km}[e^{i(\omega_{km}-\omega)t}-1]}{(\omega_{km}+\omega)} \right\} \tag{10}$$

where H'(t) is Hermitian and the splitting in two parts of equation (9) is done in order to preserve its Hermiticity. In the majority of real systems situations involving electric dipole transitions the diagonal elements of the Hermitian operators can be taken as satisfying the relation $|H_{km}|=|H_{mk}|=|H^*_{km}|$. Equation (10) results in a transition probability between states k and m equal to $$|C_k^{(1)}|^2 = \tag{11}$$

$$\frac{2}{\hbar^2} |H'_{km}|^2 \left\{ \frac{\sin^2\left[\frac{1}{2}(\omega_{km}-\omega)t\right]}{\frac{1}{2}(\omega_{km}-\omega)^2} + \frac{\sin^2\left[\frac{1}{2}(\omega_{km}+\omega)t\right]}{\frac{1}{2}(\omega_{km}+\omega)^2} \right\}$$

from which we can see that the harmonic perturbation can cause both upward and downward transitions between states m and k separated in energy by $\sim\hbar\omega$. The transition probability from state m to a group of states clustered about state k where $E_k > E_m$ and $\rho(\omega_{km})$ is the density of the final states per unit of $\omega_{km}$, can readily be found:

$$W_{m \to k} = |C_k^{(1)}|^2 = \frac{2\pi}{\hbar} |H'_{km}|^2 \rho(E_k = E_m + \hbar\omega) \tag{12}$$

which is Fermi's Golden rule for transitions between levels m and k separated by $\sim\hbar\omega$.

All the above results are the basic results of time-dependent perturbation theory and their development and applications can be found in most standard text-books. What is often overlooked are the results of time-dependent perturbation theory carried out to higher orders. Two limiting conditions were employed in deriving equations (11) and (12) which in real physical situations must hold: (i) $(2\pi/t)$ is small compared to the width of the density of states $\rho(\omega_{km})$. This is equivalent to treating the $(\sin^2 x t/_x 2)$ function as a narrow sampling function. (ii) $|C_k^{(1)}(t)|^2 \ll 1$, otherwise higher-order terms must be considered. This second condition is equivalent to starting that the results of first-order perturbation theory are only valid for times short enough and electric fields low enough so that the probability for transitions out of the initial state m is very small compared to unity, otherwise higher order terms must be included. These two conditions can be expressed mathematically as $$\frac{|H'_{km}|}{\hbar} \ll \frac{1}{t} \ll \Delta v \tag{13}$$

Conditions (13) forms the physical limits of validity of first order time-dependent perturbation theory for transitions between two energy levels separated by $\hbar\omega$.

Consider a real physical situation in the experiments performed for the MLIS process of the $UF_6$ isotope separation. A Gaussian laser beam with energy $10^{mJ}/cm^2$ and time duration t=50 ns ($2 \times 10^5$ $^W/cm^2$) interacts with the $UF_6$ molecules at the natural frequency of oscillation of the $V_3$ vibrational mode at 628.32 $cm^{-1}$. The electric field intensity E can be calculated from $P=(^{1/2})\eta c \epsilon_o |E|^2$ to be $\sim 1.2 \times 10^7$ $^V/m$. Assuming that the matrix elements $H_{km}'$ are of the electric dipole type then for an electric field E applied in the x-direction $H_{km}' \sim e x_{km} E \sim \mu_{km} E$. From the parameters of the Uranium Hexafluoride shown in FIG. 1 we obtain straight away and to a very good approximation that $(H_{km}'/\hbar) \sim 1.4 \times 10^{11}$ $s^{-1}$. We also see from FIG. 1 that $\Delta v \sim 1.5 \times 10^9$ Hz. Since $(^1/t)=2 \times 10^7$ $s^{-1}$ it is evident that although the second part of the inequality (13) holds, the first part does not hold at all and it is a long way off from being satisfied. Thus first order time-dependent perturbation alone is not adequate for the present case even such small pumping energies. Higher orders in the time-dependent perturbation analysis have to be included, an exercise which has very rarely been carried out fully in the literature, its practical implications have never been considered and the results have always been overlooked. The following is a straightforward perturbation analysis to second order where only the basic quantum mechanical concepts are used.

Consider the vibrational ladder m n l p shown in FIG. 7a, with $\omega_{mn}+\omega_{nl}=\omega_{lm}$. A field at $\omega$ interacts with the atomic or molecular system and the Hamiltonian is harmonically perturbed as in equation (9) above, with the system being in the ground state m at time t=0. The probability to second order in the perturbation of finding the system at time t in the state l is $|C_l^{(2)}(t)|^2$, where from equation (7) above $$\dot{C}_l^{(2)} = \frac{1}{i\hbar} \sum_n C_n^{(1)} H'_{ln}(t) e^{i\omega_{nl}t} \tag{14}$$

where from equation (10) and with reference to FIG. 7a $$C_n^{(1)}(t') = -\frac{1}{\hbar} \left\{ \frac{H'_{nm}[e^{i(\omega_{nm}+\omega)t'}-1]}{(\omega_{nm}+\omega)} + \frac{H'^*_{nm}[e^{i(\omega_{nm}-\omega)t'}-1]}{(\omega_{nm}-\omega)} \right\} \tag{15}$$

resulting in $$\dot{C}_l^{(2)} = -\frac{1}{i\hbar^2} \sum_n H'_{nm} H'_{ln} \times$$

$$\left\{ \frac{e^{i(2\omega+\omega_{nm}+\omega_{ln})t'} - e^{i(\omega_{nl}+\omega)t'} + e^{i(\omega_{nl}+\omega_{nm})t'} - e^{i(\omega_{nl}-\omega)t'}}{(\omega_{nm}+\omega)} + \right.$$

$$\left. \frac{e^{i(\omega_{nm}+\omega_{nl})t'} - e^{i(\omega+\omega_{nl})t'} + e^{i(\omega_{nm}+\omega_{nl}-2\omega)t'} - e^{i(\omega_{nl}-\omega)t'}}{(\omega_{nm}-\omega)} \right\}$$

from which we see straight away that for the condition of resonance of the first energy level $$\omega_{nm} = \omega \tag{16}$$

the first term is small and no resonance can occur whilst the second term tends to $$C_l^{(2)} = \frac{1}{ih^2} \sum_n H'_{nm} H'_{ln} \left\{ \frac{e^{-i(\omega-\omega_{ln})t'}}{(\omega_{nm}-\omega)} - \frac{e^{-i(2\omega-\omega_{nm}-\omega_{nl})t'}}{(\omega_{nm}-\omega)} \right\} \quad (17)$$

For a situation where $$\omega_{nm} + \omega_{ln} = \omega_{lm} \quad (18)$$

i.e. the positions of the levels n and l satisfy the condition (18), then integrating between the limits 0 and t we obtain $$C_l^{(2)} = \frac{1}{\hbar^2} \sum_n H'_{nm} H'_{ln} \left\{ \frac{e^{-i(\omega-\omega_{ln})t}-1}{(\omega-\omega_{nl})(\omega-\omega_{nm})} + \frac{e^{-i(2\omega-\omega_{nm}-\omega_{nl})t}-1}{(2\omega-\omega_{nm}-\omega_{nl})(\omega_{nm}-\omega)} \right\} \quad (19)$$

from which we see that resonant absorption can occur between levels n and l (first term) and levels m and l (second provided the conditions (16) and (18) above are satisfied. Note that both the absorption conditions can occur only if the fundamental vibration of the molecule at $\omega_{nm}=\omega$ is excited. Thus a molecule becomes highly absorbant at the second energy level m→l of a vibrational ladder provided that an energy level n near the midpoint of the m→l transition exists and that the vibration m→n is simultaneously excited. Two photon absorption is a special case of this effect. At the same time the molecule becomes absorbant between levels n→l. The probability of finding the system at time t in state l is $$|C_l^{(2)}(t)|^2 = \{C_l^{(2)}(t)\}\{C_l^{(2)}(t)\}^* = \quad (20)$$

$$\frac{1}{\hbar^4} \frac{|H'_{nm}H'_{ln}|^2}{(\omega-\omega_{nm})^2} \left\{ \frac{\sin^2\left[\frac{1}{2}(\omega_{ln}-\omega)t\right]}{\left[\frac{1}{2}(\omega_{ln}-\omega)\right]^2} + \frac{\sin^2\left[\frac{1}{2}(2\omega-\omega_{ln}-\omega_{nm})t\right]}{\left[\frac{1}{2}(2\omega-\omega_{ln}-\omega_{nm})\right]^2} \right\}$$

Equation (20), although it lacks mathematical rigour because of the resonance $(\omega-\omega_{nm})^2$ in the denominator (a frictional factor $[(\frac{1}{2})i\Gamma]$ should be incorporated in this denominator to account for the fact that the atomic states are not infinitely sharp), it provides some basic physical insights into the absorption of electromagnetic radiation by an atomic or molecular vibrational ladder. Equation (20) was derived using only basic quantum principles simply by expanding the time-dependent perturbation theory to higher orders to account for situations where the first section of inequality (13) is not satisfied in practice. The existence of the resonance term $(\omega-\omega_{nm})^2$ in the denominator of equation (20) is a manifestation that the probability of finding the molecule at a higher level is always dominated by the resonant absorption at $\omega_{nm}=\omega$. In fact if we obtain the analytical expressions for $|C_l^{(3)}(t)|^2$, $|C_l^{(4)}(t)|^2$... using the expansions of equations (7) and select the resonance terms out of the resulting complicated expressions we find that the probability of finding the molecule in any higher level is always dominated by the resonance of the first level at $\omega_{nm}=\omega$ because the factor $1/(\omega_{nm}-\omega)^2$ will always appear in all subsequent higher order expressions (this becomes evident from equations (7) where the corresponding quantum mechanical terms would be equivalent to the vibrations of a perfect harmonic oscillator). In addition the molecule becomes absorbant at the frequencies corresponding to the energy differences between the ground level and the second, third, fourth etc levels. In quantum molecular theory the molecular vibrations are anharmonic and detailed analysis shows that the selection rule $\Delta v=\pm 1, \pm 2, \pm 3...$ gives rise to numerous lines in the vibrational spectrum, with the most intense transitions being those with $v=\pm 1$; as $\Delta v$ increases the intensity drops rapidly. The weaker bands corresponding to the transitions 0→2, 0→3 etc are called overtones. It is evident, however, from the above analysis of the higher order perturbation theory, and in particular as manifested by the second order terms in equations (19) and (20), that if the fundamental vibration is simultaneously excited the induced dipole moments corresponding to these overtones increase enormously, the molecule becoming highly absorbant at these frequencies. The absorption depends on a $\sin^2 xt/x^2$ function for the various levels, similar to diffraction theory. Although a more rigorous mathematical analysis is necessary to describe the limits in equation (20) it can nevertheless be inferred that the absorption of electromagnetic radiation up a vibrational ladder occurs as if light were diffracted off the induced dipole moment of the first level in the time domain, in a manner similar to Fraunhofer difraction in the space domain. This is analogous to the stimulated Raman scattering of the higher orders as described earlier and experimentally in FIG. 3. The multiphoton absorption effect is, however, a different effect constituting the only process where there is a direct correspondence between the harmonic oscillators of the radiation field and the molecular vibrational ladder during the interaction process. In fact an advanced analysis indicates that the effect is the first physical demonstration of Feynman's path integral quantum mechanics but this is outside the scope of the present application. In addition, a rigorous analysis involves a Fourier expansion density matrix method applied to the stochastic Liouville equation where the interaction between the system and the radiation field also includes terms with frequencies corresponding to the difference between the ground and second energy excitation level in addition to the fundamental, but this is also beyond the scope of the present application. It is evident from the second term in the brackets of equation (20) that when the fundamental oscillation of a molecule is excited at $\omega_{nm}=\omega_o$ then there is an induced dipole moment between the ground level and the second energy level. Absorption of light will occur at a frequency $\omega_2$ provided that the condition $\omega_2=\omega_{ln}+\omega_{nm}$ is satisfied. At the same time, absorption will occur at $\omega_{ln}$ according to the first term in equation (20) since $\omega_2-\omega_1=\omega_{ln}$. Thus if a molecular oscillator is simultaneously subjected to two frequencies one corresponding to the energy difference between the ground level and the first excited level $\omega_1=\omega_o=\omega_{nm}$ and the other corresponding to the energy difference between the ground level and the second excited level $\omega_2=\omega_{ml}=\omega_{mn}+\omega_{nl}$, the molecule will directly absorb radiation at both these levels and in addition at a frequency $\omega_2-\omega_1=\omega_{nl}$. Absorption to higher levels will occur in an analogous way. It is evident therefore from the time-dependent perturbation analysis above, that the second frequency which must be applied to the molecule is not at the second harmonic of the fundamental frequency, as predicted by classical electrodynamics, but will be smaller and will correspond to the energy difference between the ground level and the second energy excitation level. Thus the absorption of the molecule will be largely enhanced by the simultaneous application of two frequencies $\omega_1$ and $\omega_2$ corresponding to the energy differences between the ground and the first excited level and the ground and the second energy excitation level respectively. In addition, it will also be shown later with a more advanced quantum mechanical derivation that crossing this set of beams perpendicularly with an identical set of beams derivable from the first one greatly enhances only the absorption of the desired isotope by effectively utilizing all the induced moments whilst at the same time avoiding any energy level splitting or power broadening of the unwanted isotope, leaving the latter unexcited. Note the complete analogy of the physical principles with the results of classical electrodynamics described earlier concerning the absorption of electromagnetic radiation by a molecular vibrational ladder. Thus when a molecular gas containing two isotopic species is to be selectively dissociated, an infrared laser ($\omega_1$) is tuned to the absorption band ($\omega_o$) of the desired isotopic species ($\omega_1=\omega_o$). A second powerful laser beam, collinear with the first one and polarized in the same direction, whose frequency $\omega_2$ can be finely tuned near the second energy excitation level of the molecule 1 of the desired isotope ($\omega_2=\omega_o+\omega_{12}$) is simultaneously applied to the molecular gas (see FIG. 8). The frequencies of the two lasers can be finely adjusted in the regions $\omega_1=\omega_o$ and $\omega_2=\omega_o+\omega_{12}$ to match the corresponding energy levels, and their relative powers can be controlled for the optimum selectivity with high dissociation yield. In order to enhance even more the absorption and to obtain outstanding selectivity of the desired isotopic species another set of beams at the same frequencies $\omega_1=\omega_o$ and $\omega_2=\omega_o+\omega_{12}$, derivable from the first one, is simultaneously applied to the molecular gas with their electric field vectors parallel to the direction of propagation of the original exciting pumping beams. Subsequently only the molecules of the selected isotope absorb intensely at the frequencies corresponding to $\omega_o$, $\omega_{12}$ and $\omega_o+\omega_{12}$ whilst the other isotope remains unexcited. Thus the method is extremely versatile and it can be applied to suit the particular conditions required for any closely spaced isotopes.

The following points elucidate the picture more and they are in direct analogy with the points made for the classical picture earlier but they define precisely the frequencies and powers of the two exciting lasers:

(i) when the second beam at $\omega_2=\omega_o+\omega_{12}$ is applied, there are strong coherent contributions to the absorption cross-section of the molecule at $\omega_{12}$ due to the absorption cross-section at $\omega_2-\omega_1=\omega_{12}$. At the same time the molecule becomes highly absorbant at $\omega_2=\omega_o+\omega_{12}$.

(ii) There can be no significant absorption at $\omega_2=\omega_o+\omega_{12}$ without excitation at $\omega_1=\omega_o$. The beam at $\omega_2$ also matches the alternative levels of the desired isotopic species much better than those of the unwanted isotopic species. The mismatch of the radiation frequencies for the unwanted isotope increases with higher excitation levels. It follows that even at very high pumping powers we can selectively enhance the dissociation of the desired isotopic species only.

(iii) The situation is analogous to that described earlier in classical electrodynamics but the quantum mechanical analysis has now defined the precise frequencies which must be applied to the molecular gas. The main factors which contribute to the desired isotopic species are: Absorption at $\omega_1=\omega_o$, absorption at $\omega_{21}$ due to the presence of $\omega_2=\omega_o+\omega_{12}$, and absorption by the molecule at $\omega_2=\omega_o+\omega_{12}$.

(iv) Note that in the case of heavy molecules in addition to the two frequencies $\omega_1$ and $\omega_2$ matching the first and second energy excitation levels of the molecule of the desired isotope respectively, due to the enormous density of states there always exist higher energy levels in the quasi-continuum and continuum of mixed energy states which match the total energy of groups of photons for both frequencies.

(v) The dissociation and selectivity of the desired isotope are greatly enhanced if another set of beams with identical frequencies at $\omega_1=\omega_o$ and $\omega_2=\omega_o+\omega_{12}$, derivable from the first one, is simultaneously applied to the molecular gas with their electric field vectors parallel to the direction of propagation of the original exciting pumping beams. Subsequently all the induced moments are used for absorption and the molecules of the selected isotope absorb intensely at the frequencies corresponding to $\omega_o$, $\omega_{12}$, and $\omega_o+\omega_{12}$ and they easily lift the molecules to the dissociation energy whilst the other isotope remains unexcited (see precise quantum mechanical explanation for this later).

(vi) We can control the entire selectivity and dissociation process by controlling the relative powers and frequencies of the beams. The fact that all the induced moments of only one isotope are used provides enormous selectivity of that particular isotope, whilst in addition the fact that four beams contribute directly to absorption means that the powers necessary to induce the same energy into the molecule are much less than if one beam were used and automatically power broadening and energy level splittings are enormously reduced.

To be more specific, let us consider the case of the closely spaced Uranium Hexafluoride isotopes (frequency difference~ 0.61 cm$^{-1}$). Although there are no direct experimental measurements available on the position of the second excitation level of UF$_6$, we can nevertheless calculate the frequency $\omega_{12}$ between the first and second excitation levels to a fair approximation from the available spectroscopic measurements. The deviation from harmonicity of the vibrational levels can be approximated by $$\delta v_i = \sum_i X_{ii} v_i (v_i + d_i) + \frac{1}{2} \sum_i \sum_{j \neq i} X_{ij} v_i (v_j + d_j) \quad (21)$$

where $v_i$ is the vibrational quantum number of the vibration mode $V_3$ and $d_i$ is the degeneracy of the fundamental (all frequencies are in cm$^{-1}$). The degrees of degeneracy of the six normal vibrations for the first excited states of the hexafluorides are (G. Herzberg, Infrared and Raman spectra D. von Nostrand Company, Princeton, N.J. 1968)(the type of transition involved is indicated below):

| $v_1$:1 | $v_2$:2 | $v_3$:3 | $v_4$:3 | $v_5$:3 | $v_6$:3 |
|---|---|---|---|---|---|
| (Raman) | (Raman) | (ir) | (ir) | (Raman) | (Inactive) |

In general the degrees of degeneracy of the higher excited states of the $V_3$ vibrational mode are given by $$d = \frac{1}{2}(v_3+1)(v_3+2) \quad (22)$$

and the unharmonicity constants of UF$_6$ for the $V_3$ vibrational mode are (Aldridge et al, J. Chem. Phys. 83(1), 1985): $X_{31}=X_{32}=0$, $X_{33}=-0.9\pm0.15$, $X_{34}=-0.3\pm0.07$, $X_{35}=-0.3\pm0.07$, $X_{36}=-0.2\pm0.05$; Using equations (21) and (22) and the above spectroscopic values we calculate the deviation from harmonicity of the second vibrational level of the $V_3$ vibrational mode to be ~—10.5 cm$^{-1}$. The deviation from harmonicity of the third vibrational level is also calculated to be ~—22.5 cm$^{-1}$. These values are only approximate. They are believed however to be within an accuracy of ±3.5 cm$^{-1}$ although this may not be certain due to the complicated level scheme of the UF$_6$ molecule. In practice the precise values must be determined experimentally. Note from equation (21) that the degeneracy of the fundamental should be taken into account in the calculations. For the second excitation level of the $v_3$ vibrational mode, there is a splitting of the level into a rotation-vibration doublet. For the third excitation level of the $v_3$ vibrational mode, there is a splitting of the level into a rotation-vibration triplet. Weaker Coriolis splitting may also occur. At higher levels, the rotational state splitting multiplies resulting in a quasicontinuum and continuum of mixed energy states.

FIG. 8 shows the vibrational levels of the two main isotopes of Uranium Hexafluoride $^{238}UF_6$ and $^{235}UF_6$ together with their approximate deviations from harmonicity. In order to selectively excite and dissociate only the $^{235}UF_6$ molecules, two laser beams are applied to the supercooled Uranium Hexafluoride molecular gas with their frequencies corresponding to the first and second excited levels of that particular isotope at $\omega_1=\omega_o=628.32$ cm$^{-1}$ and $\omega_2=\omega_o+\omega_{12}\sim 1246.1$ cm$^{-1}$ as shown in the figure. The precise value for $\omega_2$ must be determined experimentally. The two beams are collinear and polarized in the same direction. A set of identical beams, derivable from the first one, is simultaneously applied transversely across the molecular gas with their electric field polarizations in the direction of propagation of the original exciting pumping beams. This set is obtained by beamsplitting the original set of pumping beams in the manner shown in FIGS. 4 and 5 (see later). The relative powers of the beams which can be very high (over 100 mJ in 50 ns) can be adjusted for maximum selectivity of the desired isotopic species, the undesired isotope remaining largely unexcited. The $^{235}UF_6$ molecules absorb radiation at $\omega_o$, $\omega_{12}=\omega_2-\omega_1$, and $\omega_2$, and are readily driven through the lower vibrational states to the quasicontinuum and continuum of mixed energy states and thereafter to the dissociation limit. Thus there will be high selectivity with maximum dissociation yield in a single step process since powerful lasers can be used with enhanced absorption only for the $^{235}UF_6$ molecules.

Figure 4:
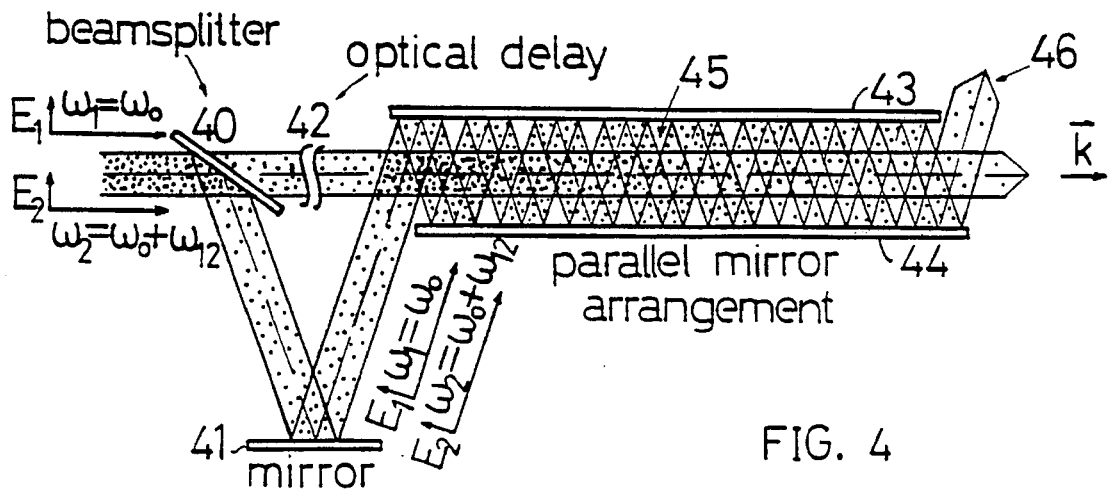
FIG. 4 shows a schematic set-up for the application of perpendicularly crossed sets of beams to the $UF_6$ molecular gas.

A practical arrangement for $UF_6$ isotope separation comprising the principles of the present invention is shown schematically in FIG. 4, where the set-up shows the application of the two perpendicularly crossed sets of beams to the molecular gas. The two pumping exciting collinear beams at $\omega_1=\omega_o$ and $\omega_2=\omega_o+\omega_{12}$ traverse the supercooled molecular gas with a direction of propagation $\vec{k}$. The supercooled molecular gas 45 is placed between two parallel reflectors 43 and 44 and the pumping exciting beams travel parallel to these reflectors. Part of the beams is separated by beamsplitter 40 placed prior to the system and is redirected through the system using mirror 41 in a zig-zag arrangement in between the two reflectors traversing the entire length of the original pumping beams in the $UF_6$ gas, as shown in the figure. A variable optical time delay 42 is introduced after beamsplitter 40 in order to synchronize the two sets of beams at the best optimum values. The two sets of beams emerge at 46, $\vec{k}$ indicating the direction of propagation of the original set of pumping beams. The zig-zag beams are shown extended in the figure for clarity reasons but they can be made near perpendicular to the exciting beams to cover entirely and uniformly their length. The shading illustrates pictorially the propagation of the two sets of beams through the $UF_6$ supercooled molecular gas within the parallel mirror arrangement. At the points of intersection the electric fields of the zig-zag beams are very nearly parallel to the direction of propagation of the exciting beams $\vec{k}$, and an enormous absorption occurs at $\omega_1=\omega_o$, at $\omega_{12}$ and at $\omega_2=\omega_o+\omega_{12}$, for the desired excited isotope $^{235}UF_6$.

The two sets of beams must in practice be obtained by splitting an initial set of beams in two and redirecting them to repetitively cross each other perpendicularly. They can, however, be manipulated in the process to provide the precise required matching for the interaction. In addition the timing of the two sets of beams can easily and precisely be controlled. Any optical system comprising two sets of collinear beams polarized in the same direction at the frequencies $\omega_1=\omega_o$ and $\omega_2=\omega_o+\omega_{12}$ derivable from the same original set of beams, crossing each other perpendicularly with the points of intersection uniformly irradiating the molecular gas, provides the necessary conditions for high dissociation with outstanding selectivity in the case of closely spaced isotopes. Precise optical systems which can contain this radiation can easily be constructed. The intersections of the two sets of beams perpendicularly are complimentary in the utilization of the induced moments i.e. the dipole (or quadrupole) moments induced by one set of beams are used for absorption by the other set of beams and vice-versa. The optimum conditions for maximum selectivity and dissociation can be obtained by adjusting the relative powers of the four beams. In addition, power broadening and energy level splitting effects are greatly reduced since all beams contribute directly to absorption and the powers necessary to induce the same energy into the molecule are only a fraction of what they would be if only one beam were used. Also any derivable system from the set of the four beams described above could suffice for certain cases so long as the induced moments are utilized for absorption of the beams in their respective directions.

Although the timing of the two sets of interacting beams is not critical since the coherence length of the original set of beams from which they were derived before the beamsplitter is much longer than the interaction length within the molecular gas, ideally they should arrive simultaneously at the points where they interact perpendicularly with the molecules. In multiphoton absorption, one molecule interacts with all the photons in one single radiation mode whereby after the interaction the necessary number of photons absorbed by the molecule are lost by that particular electromagnetic mode. Quantum theory does not allow us to know which photons were lost during the interaction process or which pathways they used in arriving at the molecule. The molecules interact with the electromagnetic fields of the particular radiation mode, not with the individual photons (more precisely they interact with the quantized electromagnetic potentials of that particular mode). It will be shown later that when the molecules are placed at the points of intersection of two perpendicularly crossed beams which are derived from the same electromagnetic mode there can be no induced magnetic dipoles during the interaction process. Subsequently no power broadening or energy level splitting effects can occur during the two-photon or multi-photon absorption processes. A system where the two sets of beams crossing each other perpendicularly arrive at the molecules simultaneously is shown in FIG. 5a. After the two sets of beams are derived from the original set of beams with frequencies $\omega_1=\omega_o$ and $\omega_2=\omega_o+\omega_{12}$ using beamsplitter 50, they are directed towards the parallel mirror arrangement (55 and 56) containing the $UF_6$ molecular gas using mirrors 51, 52 and 53 so that the pathways 50-51-52-54 and 50-53-54 are equal. Subsequently the two sets of beams arrive simultaneously at all points where they cross perpendicularly within the parallel mirror arrangement 55 and 56 containing the molecular gas. Irrespective of the powers of the beams under the conditions of interaction shown in FIG. 5a no power broadening or energy level splitting occur in the molecules, the unwanted isotopic species remaining unexcited.

In principle, the system described in FIG. 5a is analogous to a Mach-Zehnder interferometer with the second reuniting beamsplitter removed and the molecular gas placed in its position. FIG. 5b shows the equivalence of the Mach-Zehnder interferometer principle to the arrangement 5a, with the molecular gas placed in the position of the reuniting beamsplitter. The beamsplitter 57 splits the initial set of beams and the two branches 57-58a-59 and 57-58b-59 cross each other perpendicularly at the position of the molecular gas 59. Thus, the molecular gas 59 interacts with the beams of the two branches of the interferometer at the position where they cross perpendicularly, instead of a second beamsplitter reuniting them to produce interference effects. The molecular gas interacts with the electromagnetic potentials of the beams from the two branches of the interferometer which are derived from the same electromagnetic mode. The absorption characteristics for two photon and multiphoton processes using such arrangements result in no induced magnetic dipoles in the molecules during the interaction and subsequently no power broadening or energy level splitting effects can occur (these are explained theoretically later). Any other arrangements which can be constructed utilizing this principle i.e. analogous to a Mach-Zehnder interferometer with the second beamsplitter being substituted for the molecular gas is adequate for the application of such effects.

One further point should be made concerning the arrangement in FIG. 5a, in that mirror 51 can also be made partially transmitting allowing a third set of beams to travel down the axis of the system. The power level of this set of beams must be controlled to levels which do not affect the previous conditions of operation of the system. In this way, since all six beams contribute directly to absorption the powers necessary to induce the same energy into the molecule are only a fraction of what they would be if only one beam were used and subsequently power broadening and energy level, splitting effects (these effects are functions of the directions of propagation of the beam as well as its power) are enormously reduced. The selectivity of the desired isotope becomes outstanding.

Figure 6:
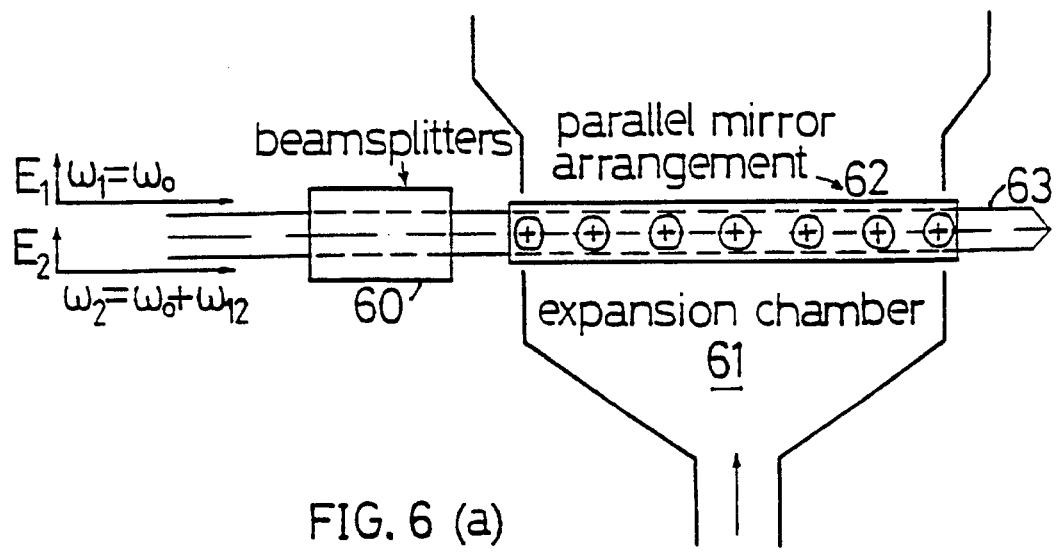
FIG. 6a shows a schematic set-up for Uranium Hexafluoride ($UF_6$) isotope separation based on the arrangement of FIG. 5a, and FIG. 6b shows a repetition of the arrangement of FIG. 6a along the direction of expansion of the molecular gas, the positions marked $\oplus$ being those where the two sets of pumping beams cross each other perpendicularly, the system allowing for a completely uniform and efficient illumination of the $UF_6$ supercooled gas.
Figure 6:
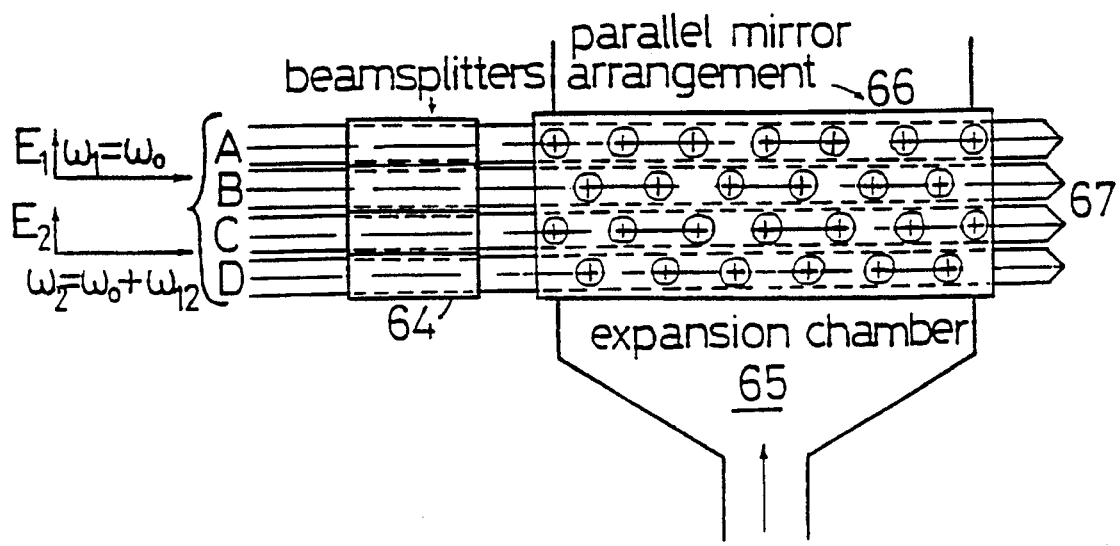

FIG. 6a shows schematically the application of the laser beams to the molecular gas through the expansion chamber 61. It embodies the practical application of FIG. 5a through the expansion supercooling chamber. The $UF_6$ expansion supercooled molecular gas flows through the parallel mirror arrangement 62 where it interacts with the laser beams. A beamsplitter arrangement 60 similar to the one in FIG. 5a is placed before the system and provides the two identical sets of beams which subsequently traverse the expansion supercooled gas, crossing each other perpendicularly along its length. The section of the beams within the supercooled gas marked ⊕ is simultaneously traversed by the two identical sets of beams repetitively reflected in a plane normal to the plane of the paper in the manner shown in FIGS. 4 and 5a. The points marked ⊕ are the positions where the two sets of pumping beams cross each other perpendicularly. In the case of an expansion supercooling nozzle of the type used in all MLIS experiments so far, this extra modification can very easily be incorporated simply by making the reflecting mirrors 62 parallel to the walls of the nozzle i.e. their surface will be parallel to the plane of the paper in FIG. 6a. The beams emerge at 63. The arrangement of FIG. 6a can be repetitively applied in the direction of expansion of the supercooled molecular gas. Since it provides excellent selectivity, this extension of the overall system will enormously improve the efficiency. In order to efficiently irradiate the whole of the supercooled gas the points of perpendicular intersections of the two sets of beams, marked ⊕, within the molecular gas should alternatively be moved at new positions for each arrangement for uniform overall interaction with the gas entering the expansion chamber 65, as shown schematically in FIG. 6b. Each of the sets of beams A, B, C and D constitutes an arrangement similar to that of FIGS. 6a and 5a. Each part of the beamsplitter arrangement 64 is similar to the beamsplitter arrangement of FIG. 5a. The positions marked ⊕ are the points where the two sets of pumping beams cross each other perpendicularly. The parallel mirror arrangement 66 can be made as large as necessary to accommodate all sets of beams A, B, C and D, and any more that one might wish to add. Each arrangement must be fired into the molecular gas with a time delay equivalent to the time taken for the gas to expand from the position of one arrangement to the position of the following arrangement (expansion velocity of the supercooled $UF_6$ molecular gas is approximately ~$10^4$ cm/sec). This can easily be achieved by controlling the triggering of the laser systems. The beams emerge at 67. The arrangement can be repeated as many times as necessary and provides uniform and efficient illumination of the supercooled $UF_6$ molecular gas. This extension of repetitively irradiating the supercooled gas along the direction of its expansion using time delays corresponding to the velocity of expansion of the gas can be applied for any optical arrangement. All the modifications and applications of the laser beams in the MLIS process are very easy to construct simply because the physical dimensions of the expansion supercooling nozzle needed for a full scale plant are very small compared to any other process. Any ultra-violet beam which might help enhance the efficiency of the system is also readily applicable. An actual system based on the schematic arrangements of FIGS. 6a and 6b can be constructed as a small compact module. Because the entire system, even the one for commercial separation can be very small and compact (see later) all such arrangements can very easily and precisely be constructed.

Some experimental evidence which hints towards the results described herein exists in the scientific literature. In a Russian paper (S. S. Alimpiev et al., Kvantova Elektron., Vol. 8, No 3, p. 623, 1981) experimental results are presented when two infrared frequencies were applied to the $UF_6$ molecular gas, one from a $CF_4$ laser at 615 cm$^{-1}$ near the $UF_6$ absorption band (628 cm$^{-1}$) and the other one was tuned across the $CO_2$ spectral range. FIG. 7b is taken from the above mentioned reference and shows the dependence of the $UF_6$ two frequency dissociation yield ($\simeq$ fluorescence) on the $CO_2$ frequency. It can be seen that for a fixed exciting frequency at 615 cm$^{-1}$ the dissociation can be considerably enhanced by tuning the $CO_2$ laser further towards the high frequency range. It is evident that the peak of the graph lies well beyond the tuning range of the $CO_2$ laser and can be inferred that it could lie beyond 1200 cm$^{-1}$. The fixed exciting frequency (at 615 cm$^{-1}$) also lies well outside the peak of the $UF_6$ absorption band. This, together with the fact that the fluences used for this frequency (615 cm$^{-1}$) in the experiments were very high (~150$^{mJ}$/cm$^2$), account for the indication that the curve would have continued in a very long flat top. No measurements on the selectivity were reported. Although the experimental results described in this scientific paper are of a different nature and a long way off the ones required herein they nevertheless hint towards the fact that if the conditions described in the present invention were met the curve in FIG. 7b would have been transformed into a narrow peak centred around 1246.1 cm$^{-1}$, the frequency corresponding to the second excitation level of $UF_6$. In fact a number of other experiments on two frequency dissociation exist in the Russian literature which provide hints further supporting the principles of the present invention. Recently more experiments reported from Japan (T. Oyama et al., J. Nuclear Science and Technology Vol. 23, No 6, pp 522–528, June 1986) indicate that measurements on the dissociation yield of the $UF_6$ molecular gas when it is simultaneously irradiated by two lasers, a $CF_4$ laser at 615 $cm^{-1}$ and a $CO_2$ laser at 1073 $cm^{-1}$ show a clear threshold exists around 70J/cm² for the fluence of the $CO_2$ laser, but not for that of the $CF_4$ laser. The results indicate that a slight excitation by the latter laser serves to induce $UF_6$ dissociation which suggests that the dissociation energy is supplied in large part by the $CO_2$ laser. In the perspective of the invention described here, it is easy to conclude that the threshold of visible luminescence intensity on $CO_2$ laser fluence will diminish as the wavelengths of the irradiating lasers approach the conditions of the present analysis. The existence of such a high threshold for the $CO_2$ laser is a reflection of the fact that the irradiation frequency is so far away from the conditions set by equation (20). In fact careful comparison of the Japanese results with the above mentioned Russian results indicates that the $CO_2$ laser threshold reported in the latter was half that reported in the former as expected: the $CO_2$ laser frequency in the Russian work (1085 $cm^{-1}$) was much nearer to the conditions set by equation (20) than the one used in the Japanese work (1073 $cm^{-1}$). It is also clear by looking at FIG. 7b why such a small difference in the frequency used in the Russian work (12 $cm^{-1}$ further than the Japanese work) has caused the $CO_2$ threshold for visible luminescence to drop by more than half. The above results were random observations on the dissociation yield of $UF_6$ when it is simultaneously irradiated by two standard laser systems, a $CF_4$ laser system at 615 $cm^{-1}$ and a $CO_2$ laser at 1073 $cm^{-1}$. They were cited here because they provide experimental hints supporting the results of the present analysis.

The greatest asset of the present invention is the extremely high selectivity (which is the major factor that has inhibited the MLIS process at high pumping powers in the past) it provides between the two Uranium Hexafluoride isotopes. One of the main factors for the outstanding selectivity claimed here is due to the fact that the molecules are being subjected to two perpendicular and identical sets of pumping beams (same frequencies and bandwidths or more precisely one set of beams split in two parts which are subsequently crossed perpendicularly). The complete explanation of this process requires a more elaborate quantum mechanical analysis than the elementary principles cited earlier and it is beyond the scope of the present application. In what follows it will be shown that the energy levels of an atom or molecule which is subjected to powerful electromagnetic radiation are split by large amounts due to induced magnetic dipoles during the interaction process and this is the major factor in the loss of selectivity. Subsequently it will be clearly demonstrated that any atom or molecule which is a close match to a harmonic oscillator and which is subjected to two perpendicular and identical sets of beams (same frequencies and bandwidths or more precisely one beam split in two parts which are subsequently crossed perpendicularly) containing frequencies which match the energy levels of the harmonic oscillator, can experience no splitting of the energy levels due to induced magnetic dipoles during two-photon and multiphoton absorption processes thus enabling the energy levels of the desired isotope to be precisely selected during the absorption process. In practice the beams must be derived from the same original set of beams that is split in two parts which are subsequently crossed perpendicularly. The induced electric quadrupoles (E2) are also fully exploited during the absorption process utilizing the present system.

The starting point for the description of the interaction of radiation with matter is the Schrödinger equation for an electron including electromagnetic coupling which has been well established over the past forty years. From this equation we obtain the well known expression for the interaction Hamiltonian $H_{int}$ of a radiation field with an atomic system $$H_{in_t} = \frac{e}{mc} \vec{p} \cdot \vec{A} + \frac{e^2}{2mc^2} A^2 + \frac{e\hbar}{2mc} \vec{\sigma} \cdot \nabla \times \vec{A} \quad (23)$$

where $\vec{A}$ is the vector potential, $\vec{p}$ is the momentum of the electron of rest mass m and charge e, and $\vec{\sigma}$ is the spin. For an atomic transition between an initial atomic state |i> and a final state |f> the matrix elements of the corresponding interaction Hamiltonian for a one photon process can be obtained from an analysis of the $\vec{p} \cdot \vec{A}$ term in equation (23) to lowest order. This term is the dominant in electromagnetic interactions involving one photon processes. The analysis is beyond the scope of the present application but it can be found in most advanced textbooks on Quantum Mechanics. What is relevant to the present invention is that in addition to the matrix elements of the induced electric dipole moment which causes the transition between the two energy states of the atomic or molecular system, there also exist matrix elements for the induced magnetic dipole (M1) and the induced electric quadrupole (E2) resulting from the expansion of the exponential factor to higher orders. These are well known and can be found in some advanced textbooks on quantum mechanics. They can be shown to be describable by the antisymmetric operator $O_A$ (for the induced magnetic dipoles) and the symmetric operator $O_s$ (for the induced electric quadrupoles) given by $$O_A = \frac{1}{2} i\vec{e} \cdot (\vec{p}\vec{r} - \vec{r}\vec{p}) \cdot \vec{k} \quad (24)$$

$$<f|O_A|i> = -i \left( \frac{m\omega_k}{e} \right) (\vec{k} \times \vec{e}) \cdot <f|\mu_L|i>$$

$$O_S = \frac{1}{2} i\vec{e} \cdot (\vec{p}\vec{r} + \vec{r}\vec{p}) \cdot \vec{k} \quad (25)$$

$$<f|O_S|i> = -\frac{m\omega_k^2}{2c} \vec{e} \cdot <f|Q|i> \cdot \vec{k}$$

with $\vec{\mu}_L = -\beta \vec{L}$ and $Q = \vec{r}\vec{r} - \frac{1}{3} r^2 \sigma_{ab}$ where $\vec{e}$ is the unit vector in the direction of the electric field, $\vec{k}$ is the unit vector in the direction of propagation ($\vec{k} = \vec{k}/|k|$), $\vec{r}$ is the position vector of the electron, $\omega_k$ is the frequency of radiation, $\mu_L$ is the induced magnetic dipole moment, $\beta$ is the Bohr magneton and $\vec{L}$ is the orbital angular momentum operator. Q is the dipolar coupling tensor which is an irreducible symmetric and traceless tensor of rank 2, and it is the tensor which defines the characteristics of the induced quadrupole moment.

The antisymmetric operator $O_A$ causes splitting of the energy levels due to induced magnetic dipoles differing in energy by $\sim \vec{\mu}_L \cdot \vec{B}$ in a similar way that splitting of the energy levels occurs in a static magnetic field (see Messiah "Quantum Mechanics" Vol. 2). Even at high pumping powers the splitting of the energy levels taking part in the interaction is small. For pumping intensities as high as $1.7 \times 10^{11}$ (100 mJ in 30 ns in a beam of diameter 0.5 cm) the splitting of the energy levels in a typical two level absorption system is calculated to be less than 0.02 cm$^{-1}$. This level of splitting cannot inhibit selectivity in a two level absorption system. In a two-photon or multiphoton absorption process however, higher order electromagnetic interactions are involved and the situation is completely different but before describing this process some points should be made about the symmetric operator $O_s$. This is best accomplished by considering the general selection rules which emerge from the Wigner-Eckart theorem. Although the analysis is complex, it is a well known fact that the induced electric quadrupole can cause transitions between states differing by $\Delta J=0, \pm 1, \pm 2$ and in the cases of a single electron in the vibrational-rotational molecular ladder the angular momentum quantum number changes by $\Delta l=0, \pm 2$ only. The induced electric quadrupole moment can thus be visualized as causing transitions between two energy states, a third state facilitating the transition process. This means that during the transition between two adjacent energy levels the induced quadrupole moment established matrix elements between the ground level and the second energy level of excitation. In fact the existence of a third energy level in which the atom never actually exists but it takes part in the quadrupole interaction process can readily be demonstrated. By taking the scalar product of a particular eigenfunction j ($j \neq i \neq f$) corresponding to a particular energy state $|j\rangle$ with the eigenfunctions of the states $|f\rangle$ and $|i\rangle$ it can be shown that the induced dipolar coupling tensor Q is equivalent to $$Q = \vec{r}\vec{r} - \frac{1}{3} r^2 \delta_{ab} \equiv |j\rangle\langle j| \qquad (25)$$

where $|j\rangle\langle j|$ is well known to be an operator. Since Q is a traceless symmetric tensor, the operator $|j\rangle\langle j|$ is also traceless. But from the Dirac notation algebra $$Tr|j\rangle\langle j|=\langle j|j\rangle$$

therefore $$TrQ = Tr\left(\vec{r}\vec{r} - \frac{1}{3} r^2 \delta_{ab}\right) = 0 \qquad (26)$$
$$= Tr|j\rangle\langle j| = \langle j|j\rangle = 0$$

from which we see that the scalar product of the state $|j\rangle$ is zero. This means that although the state $|j\rangle$ establishes matrix elements and facilitates the transition process between states $|i\rangle$ and $|f\rangle$ the system is never actually in state $|j\rangle$. In addition we see from equation (25) that the induced quadrupole moment has components both along the direction of the electric field $\vec{e}$ as well as along the direction of propagation $\vec{k}$. The induced quadrupole moment is thus fully exploited during the application of the present invention to improve both the selectivity and dissociation process. As pointed out above however although in a two level absorption system both the induced magnetic dipole moment and the induced electric quadrupole moment have in general a very small effect on the interaction process, the situation is entirely different in a two-photon or multiphoton absorption process. This is what will now be demonstrated.

We will refer to the case of two-photon absorption which is the simplest case of multiphoton absorption. Two-photon absorption is the process by which two incident photons (k$\lambda$) and (k'$\lambda$') with nearly the same energy and with specified energy, polarization and propagation direction are absorbed by an atomic or molecular system, the latter making a transition to a final state whose energy is approximately ($\hbar\omega_k + \hbar\omega_{k'}$), the process being facilitated by the existence of an intermediate state near the middle of the initial and final states. The two-photon absorption process results from the higher order terms of the electromagnetic interaction in which two photons are lost. Contributions to the two-photon absorption process will originate from the matrix elements of the $A^2$ term in equation (23) which are nonvanishing when there is a loss of two photons during the interaction process, and from the higher order terms in the $\vec{p} \cdot \vec{A}$ term in equation (23) in the expansion of the general form of the Fermi Golden rule for transitions. The analysis of the derivation of the matrix elements for two-photon absorption is outside the scope of the present account but the procedure is very similar to the derivation of the Kramers-Heisenberg dispersion formula for scattering. The matrix elements for two-photon absorption are (we also retain the exponentials):

$$\langle F|H_{int}|I\rangle = \frac{2\pi e^2 \hbar}{mV} \sqrt{\frac{nn'}{\omega_k \omega_{k'}}} \left\{ \frac{1}{2} (\vec{e} \cdot \vec{e'}) \langle f|e^{i(\vec{k}+\vec{k'}) \cdot \vec{r}}|i\rangle + \right.$$
$$\left. \frac{1}{m} \sum_l \left[ \frac{\langle f|(\vec{e'} \cdot \vec{p}) e^{i\vec{k'} \cdot \vec{r}}|l_1\rangle \langle l_1|(\vec{e} \cdot \vec{p}) e^{i\vec{k} \cdot \vec{r}}|i\rangle}{E_i - E_{l_1} + \hbar\omega_k} + \right. \right.$$
$$\left. \left. \frac{\langle f|(\vec{e} \cdot \vec{p}) e^{i\vec{k} \cdot \vec{r}}|l_2\rangle \langle l_2|(\vec{e'} \cdot \vec{p}) e^{i\vec{k'} \cdot \vec{r}}|i\rangle}{E_i - E_{l_2} + \hbar\omega_{k'}} \right] \right\} \qquad (27)$$

where n, n' are the photon occupation numbers for the two frequencies designated on all parameters by the dashed and undashed symbols; V is the interaction volume, $E_i$ is the initial energy of the atomic system before interaction and $E_{l_1}$ and $E_{l_2}$ are the two intermediate levels corresponding to the two different pathways through which the system can reach from the initial state I to the final state F (in the same way as in the derivation of the Kramers-Heisenberg dispersion formula for scattering), the denominators becoming resonant at the same time during the two-photon absorption process. The first term in the brackets in equation (27) results from the $A^2$ term in equation (23) and the others from the higher order expansion of the $\vec{p} \cdot \vec{A}$ term. The two-photon absorption cross-section can be calculated from equation (27) using the generalized form of Fermi's golden rule for transitions. When the two photons are the same, the two-pathways are also the same and the matrix elements for two-photon absorption becomes (also on expanding the exponentials):

$$\langle F|H_{int}|I\rangle_{two\ photon} = \frac{2\pi e^2 \hbar}{mV} \frac{n}{\omega_k} \left\{ i\langle f|\vec{k} \cdot \vec{r}|i\rangle + \frac{2}{m} \sum_l \frac{\langle f|\vec{e} \cdot \vec{p}|l\rangle \langle l|\vec{e} \cdot \vec{p}|i\rangle}{E_i - E_l + \hbar\omega_k} + \right.$$
$$\left. \frac{1}{m} \sum_l \frac{\langle f|\vec{e} \cdot \vec{p}|l\rangle \langle l|i(\vec{e} \cdot \vec{p})(\vec{k} \cdot \vec{r})|i\rangle}{E_i - E_l + \hbar\omega_k} + \frac{\langle f|i(\vec{e} \cdot \vec{p})(\vec{k} \cdot \vec{r})|l\rangle \langle l|\vec{e} \cdot \vec{p}|i\rangle}{E_i - E_l + \hbar\omega_k} + \cdots \right] \right\} \qquad (28)$$

or on evaluating equation (28) in terms of the antisymmetric and symmetric operators $O_A$ and $O_s$ given by equations (24) and (25) and separating the induced magnetic dipole terms from the induced electric quadrupole terms, we obtain $$\langle f|H_{int}|i\rangle_{two\ photon} = \frac{2\pi e^2 \hbar}{mV} \frac{n}{\omega_k} \sum_l \left\{ i\langle f|\vec{k}\cdot\vec{r}|i\rangle - 2m\omega_k^2 \frac{(\vec{e}\cdot\langle f|\vec{r}|l\rangle)(\vec{e}\cdot\langle l|\vec{r}|i\rangle)}{E_i - E_l + \hbar\omega_k} + \right. \tag{29}$$

$$\frac{m\omega_k^2}{e} \sum_l \frac{(\vec{e}\cdot\langle f|\vec{r}|l\rangle)[(\vec{\kappa}\times\vec{e})\cdot\langle l|\mu_L|i\rangle] + [(\vec{\kappa}\times\vec{e})\cdot\langle f|\mu_L|l\rangle](\vec{e}\cdot\langle l|\vec{r}|i\rangle)}{E_i - E_l + \hbar\omega_k} -$$

$$\left. \frac{im\omega_k^3}{2c} \sum_l \frac{(\vec{e}\cdot\langle f|\vec{r}|l\rangle)(\vec{e}\cdot\langle l|Q|i\rangle\cdot\vec{\kappa}) + (\vec{e}\cdot\langle f|Q|l\rangle\cdot\vec{\kappa})(\vec{e}\cdot\langle l|\vec{r}|i\rangle)}{E_i - E_l + \hbar\omega_k} + \ldots \right\}$$

A damping factor $(\frac{1}{2})i\Gamma$, where $\tau=\hbar/\Gamma=$lifetime of the state, should be added to the denominators in equations (28) and (29) to account for the fact that the atomic states are not infinitely sharp. We see from the first term in the brackets the well known result that in the electric dipole approximation there is no contribution from the $A^2$ term to two-photon absorption. We also observe from equation (29) that the induced electric quadrupoles appear in the imaginary terms a reflection of the fact that the matrix elements correspond to a level in which the atom never actually exists as shown previously in equation (26). It is now evident from equations (28) and (29) that the induced magnetic dipole moments and the induced electric quadrupole moments are by no means negligible at resonance during the two-photon absorption process (a result that can be extended to multiphoton absorption). At resonance the induced magnetic dipoles attain large values and the energy levels taking part in the interaction process are split into multiplets in the same way as if the atom were placed in a static magnetic field. Calculations indicate that for a beam with pumping intensity of $1.7\times10^{11}$ w/m$^2$ (100 mJ in a beam of diameter 0.5 cm) the level splitting ($\sim\vec{\mu}_L\cdot\vec{B}$) can be well over 0.4 cm$^{-1}$ for the $v_3$ mode of UF$_6$, and the whole multiplet can extend well over 2 cm$^{-1}$. This splitting of the energy levels during resonant transitions in higher order electromagnetic interactions involving two-photon and multiphoton absorption processes becomes a major factor in the loss of selectivity at high pumping powers. In the cases where the frequency separation of the two isotopes is very large as in the case of SF$_6$ ($\sim$17 cm$^{-1}$) the splitting of the energy levels during the interaction process does not impair selectivity, but on the contrary it provides better matching between the energy levels and helps multiphoton absorption. In the cases, however, where the frequency separation of the two isotopes is small as in the case of the UF$_6$ isotopes ($\sim$0.62 cm$^{-1}$) the overall splitting of the energy levels during the interaction process, extends well beyond the isotope separation frequency at high pumping powers, and this becomes a major factor in the loss of selectivity.

At first sight one might well ask the question why such splitting of the energy levels does not occur in the well studied phenomena of scattering (in the scattering process such as Raman scattering or Rayleigh scattering there is no change in the total number of photons before and after the interaction process). The answer to this question becomes clear if we write down the equivalent expression to equation (27) for the scattering matrix elements (these are the matrix elements which lead to the Kramers-Heisenberg dispersion formula for scattering; here we also write the complete expression including the exponentials as in equation (27)):

$$\langle f|H_{int}|i\rangle_{scattering} = \frac{2\pi e^2 \hbar}{mV} \sqrt{\frac{n(n'+1)}{\omega_k\omega_{k'}}} \left\{ (\vec{e}\cdot\vec{e'})\langle f|e^{i(\vec{k}-\vec{k'})\cdot\vec{r}}|i\rangle + \right. \tag{30}$$

$$\left. \frac{1}{m} \sum_l \left[ \frac{\langle f|e^{-i\vec{k'}\cdot\vec{r}}(\vec{e'}\cdot\vec{p})|l_1\rangle\langle l_1|e^{i\vec{k}\cdot\vec{r}}(\vec{e}\cdot\vec{p})|i\rangle}{E_i - E_{l_1} + \hbar\omega_k} + \right.\right.$$

$$\left.\left. \frac{\langle f|e^{i\vec{k}\cdot\vec{r}}(\vec{e}\cdot\vec{p})|l_2\rangle\langle l_2|e^{-i\vec{k'}\cdot\vec{r}}(\vec{e'}\cdot\vec{p})|i\rangle}{E_i - E_{l_2} + \hbar\omega_{k'}} \right] \right\}$$

where the dashed and undashed symbols refer to the scattered and incident photons respectively. We see that equation (30) unlike equation (27) contains negative as well as positive exponentials. On expanding the terms in equation (30) in order to obtain equivalent expressions to equations (28) and (29), we find that the induced magnetic dipole terms cancel out as a result of the positive and negative exponentials. This does not happen with the induced quadrupole terms. Consequently there can be so splitting of the energy levels during the scattering process. Energy level splitting during high power electromagnetic interactions occurs only during two-photon and multiphoton absorption processes i.e. processes where two or more photons are lost. What remains now is to demonstrate that under the conditions of the present invention, there can be no energy level splittings at all, rendering the system an outstanding selectivity in the separation of UF$_6$ isotopes.

On evaluating the magnetic dipole (M1) and the electric quadrupole (E2) electromagnetic potentials in Cartesian rectangular components for the cases where the wavelength of light is much bigger than the atomic dimensions, one obtains the well known expressions: For the magnetic dipole (M1)

$$(A_x^{(2)})_{M1} = i\frac{k}{2}(z\vec{e}_x - x\vec{e}_z) \qquad (A_y^{(2)})_{M1} = i\frac{k}{2}(z\vec{e}_y - y\vec{e}_z) \tag{31}$$

For the electric quadrupole (E2)

$$(A_x^{(2)})_{E2} = i\frac{k}{2}(z\vec{e}_x - x\vec{e}_z) \qquad (A_y^{(2)})_{E2} = i\frac{k}{2}(z\vec{e}_y - y\vec{e}_z) \tag{32}$$

giving $$A_x^{(2)} = ikz\vec{e}_x \qquad A_y^{(2)} = ikz\vec{e}_y$$

Relations (31) and (32) are the results of a complete multipole expansion of the electromagnetic field propagating in the z-direction with propagation vector $\vec{k}$. FIG. 9a shows the unit vectors of equations (31) and (32), z being the direction of propagation of the electromagnetic field. They indicate clearly that for an electromagnetic field propagating along the z-direction and polarized along the x-direction both the magnetic dipole (M1) and the electric quadrupole (E2) possess a component in the z-direction although their sum (the complete second order term $\vec{A}_x^{(2)}$) is only in the x-direction. The same happens if the field is polarized in the y-direction. Thus although the second order electromagnetic potential $\vec{A}_x^{(2)}$ is in the x-direction, the individual magnetic dipoles (M1) and electric quadrupoles (E2) possess components in the z-direction which are equal and opposite.

During the interaction of electromagnetic radiation with atoms or molecules according to the field coupled Schrödinger equation, magnetic dipoles (M1) and electric quadrupoles (E2) are induced in the atom or molecule during a resonant transition. These correspond to the antisymmetric operator $O_A$ and the symmetric operator $O_s$ respectively, as pointed out above. The correspondence of the induced magnetic dipoles (M1) to the antisymmetric operator $O_A$ and of the induced electric quadrupoles (E2) to the symmetric operator $O_s$ can readily be demonstrated from the $\vec{p} \cdot \vec{A}$ term (see equation 23) of the electromagnetic interaction:

Taking the propagation vector $\vec{\kappa}$ in the z-direction
the polarization vector $\vec{e}$ in the x-direction
then $\vec{\kappa} \times \vec{e}$ is in the y-direction and $$O_A = \frac{1}{2} i\vec{e} \cdot (\vec{p}\vec{r} - \vec{r}\vec{p}) \cdot \vec{k} = \frac{1}{2} ik(\vec{\kappa} \times \vec{e}) \cdot (\vec{r} \times \vec{p}) \quad (33)$$

$$= \frac{1}{2} ik (\vec{r} \times \vec{p})_y$$

$$= \frac{1}{2} ik(zp_x - xp_z)$$

Taking the multipole expansion of the electromagnetic field in the interaction Hamiltonian $(e/mc)\vec{p} \cdot \vec{A}$ we obtain from equation (31), $$(\vec{A}_x^{(2)})_{M1} \cdot \vec{p} = \frac{1}{2} ik(z\vec{e}_x - x\vec{e}_z) \cdot (p_x\vec{e}_x + p_y\vec{e}_y + p_z\vec{e}_z) \quad (34)$$

$$= \frac{1}{2} ik(zp_x - xp_z)$$

$$= O_A$$

A corresponding proof when the polarization vector $\vec{e}$ is in the y-direction is readily derivable in a similar manner (for $\vec{A}_y^{(2)} \cdot \vec{p}$), thus clearly establishing that the antisymmetric operator $O_A$ is a magnetic dipole (M1) operator. The multipole character of the induced quadrupole moment operator $O_s$ can also readily be demonstrated:

$$O_S = \frac{1}{2} i\vec{e} \cdot (\vec{p}\vec{r} + \vec{r}\vec{p}) \cdot \vec{k} \quad (35)$$

$$= \frac{1}{2} ik\{(\vec{e} \cdot \vec{p})(\vec{r} \cdot \vec{\kappa}) + (\vec{e} \cdot \vec{r})(\vec{p} \cdot \vec{\kappa})\}$$

$$= \frac{1}{2} ik(zp_x + xp_z)$$

Again taking the multipole expansion of the electromagnetic field in the interaction Hamiltonian $(e/mc)\vec{p} \cdot \vec{A}$ we obtain from equation (32), $$(\vec{A}_x^{(2)})_{E2} \cdot \vec{p} = \frac{1}{2} ik(z\vec{e}_x - x\vec{e}_z) \cdot (p_x\vec{e}_x + p_y\vec{e}_y + p_z\vec{e}_z) \quad (36)$$

$$= \frac{1}{2} ik(zp_x + xp_z)$$
$$= O_S$$

A corresponding proof when the polarization vector $\vec{e}$ is in the y-direction is readily derivable in a similar manner (for $\vec{A}_y^{(2)} \cdot \vec{p}$), thus clearly establishing that the symmetric operator $O_s$ is an electric quadrupole (E2) operator. We notice that equations (33) and (35) for the operator of the induced magnetic dipoles and the operator of the induced electric quadrupoles in an atom or molecule during a resonant transition are directly analogous to equations (31) and (32) for the magnetic dipoles (M1) and electric quadrupoles (E2) in the multipole expansion of the electromagnetic field.

We now investigate what happens to an atom or molecule when it is subjected to powerful electromagnetic radiation from two identical and perpendicularly crossed sets of beams containing frequencies which correspond to the energy levels of the molecular oscillator (or more accurately one set of beams split in two parts which are subsequently crossed perpendicularly) under resonant conditions, as in the present invention. The situation is shown schematically in FIG. 9b. The antisymmetric operator $O_A$ for the induced magnetic dipole during a resonant transition due to beams 1 travelling along the z-direction is given from equations (33) and (34) as $$(O_A)_{beams\ 1} = \frac{1}{2} ik(zp_x - xp_z)$$

For the identical beams 2 travelling along the x-direction with their E-vector in the z-direction simultaneously crossing the first ones at the position of the atom (or more precisely the same beams split in two parts which are subsequently crossed perpendicularly at the position of the atom or molecule, i.e. derivable from the same electromagnetic mode)

$$(O_A)_{beams\ 2} = \frac{1}{2} ik(xp_z - zp_x)$$

The resultant induced magnetic dipole in the atom or molecule is $$(O_A)_{beams\ 1} + (O_A)_{beams\ 2} = 0 \quad (37)$$

The symmetric operator $O_S$ for the induced electric quadrupoles under the same conditions (FIG. 9b) is given, from equations (35) and (36), by $$(O_S)_{beams\ 1} = \frac{1}{2} ik(zp_x + xp_z)$$

For the identical beams 2 travelling along the x-direction with their E-vector in the z-direction simultaneously crossing the first ones at the position of the atom or molecule (or more precisely the same set of beams split in two parts which are subsequently crossed perpendicularly at the position of the atom or molecule, i.e. derivable from the same electromagnetic mode)

$$(O_S)_{beams\ 2} = \frac{1}{2} ik(xp_z + zp_x)$$

The resultant induced electric quadrupole in the atom or molecule is $$(O_S)_{beams\ 1} + (O_S)_{beams\ 2} = ik(zp_x + xp_z) \quad (38)$$

It is now clear from equation (37) that when an atom or molecule is subjected to two perpendicularly crossed identical sets of beams, derivable from the same set of beams (or more precisely to the same set of beams split in two parts which are subsequently crossed perpendicularly at the position of the oscillators) under resonant conditions there can be no induced magnetic dipoles at all and subsequently there can be no splitting of the energy levels taking part in the transition. It must be noted that the result in equation (37) is completely independent of the power or intensity of the beams; it occurs simply because the components of the induced magnetic dipoles cancel out when an atom or molecule, which is a close match to a harmonic oscillator, during a two-photon or multiphoton resonance transition, is placed under the conditions of FIG. 9b. In addition, we see from equation (38) that the induced electric quadrupole increases and moreover it has a component in the direction of propagation z of the initial beam. It is evident now by taking into account also the fact that the induced electric quadrupole establishes matrix elements between the ground and second energy excitation levels that the induced electric quadrupole moment is fully exploited when the atom or molecule is, in addition, also subjected to two perpendicularly crossed beams (or more precisely one beam split in two parts which are subsequently crossed perpendicularly) whose frequency corresponds to that between the ground and the second energy excitation levels as in the present invention. Equations (28) and (29) fully establish the fact that when an atom or molecule is subjected to powerful electromagnetic radiation under resonance conditions in a two-photon or multiphoton absorption process, induced magnetic dipole moments split the energy levels the overall splitting overlapping the separation of closely spaced isotopes. In the case of $UF_6$ isotopes this becomes one of the major factors in the loss of selectivity. Equation (37) fully establishes the fact that any atom or molecule which is a close match to a harmonic oscillator and which is subjected to two perpendicularly crossed identical beams containing frequencies that correspond to the energy levels of the oscillator (or more precisely to the same set of beams which is split in two parts and which are subsequently crossed perpendicularly at the position of the oscillators) under resonance conditions, can experience no induced magnetic dipoles, and subsequently no splitting of the energy levels taking part in the transition can occur at all. Note that in the case where the crossed beams contain two frequencies corresponding to the first and second energy excitation levels of the molecular oscillator, as in the present invention, the effect is much more pronounced as it is not only the two frequencies which match the levels of the oscillator but also their difference between levels 1 and 2. Any number of frequencies is acceptable so long as they correspond in sequence to the levels of the oscillator, and any system derivable from the perpendicularly crossed sets of beams may suffice such as the application of any two or three or four etc beams, so long as the fundamental vibration is excited. Subsequently in the process of isotope separation, as described in the present invention, only one isotope can be precisely selected and dissociated, the selectivity of the system becoming outstanding.

In strict mathematical terms, the analysis should have been carried out from an initial summation over the terms of the electromagnetic potential of the two perpendicular beams, derivable from the same beam, and subsequent analysis of the interaction process. The results are exactly the same and the present analysis is more than adequate for the demonstration needed. It can readily be noted, however, that the induced electric dipole causing the absorption of one photon is not affected at all because of the crossing of the beams (derivable from the same beam) simply because it corresponds to the approximation where the exponentials are set equal to unity, $e^{i\vec{k}\cdot\vec{r}} \sim 1$. The induced magnetic dipoles and electric quadrupoles are affected simply because they originate from higher order terms in the expansion of the exponentials. In strict scientific terms, this is the first practical application and demonstration of the principles on photons derivable from the Einstein-Podolsky-Rosen paradox but pure scientific explanations are not within the scope of the present account. Application of the principles of the present invention is possible because it can be demonstrated that the multiphoton effect presents the first case where there is a very close direct correspondence between the harmonic oscillators of the radiation field and the harmonic oscillators of the vibrational ladder, but again this is beyond the scope of the present application. Every aspect of the dissociation and selectivity of the present invention for the separation of the Uranium Hexafluoride isotopes has now fully and precisely been explained.

Recapitulating the major results:

(a) Enormous dissociation yield with high selectivity due to the application of two beams matching the first and second energy excitation levels of the desired isotope at the same time minimizing the effect of power broadening.

(b) Full exploitation of the electric dipole and electric quadrupole moments along and perpendicularly to the direction of propagation of the pumping beams induced by crossing the two sets of beams perpendicularly, for higher selectivity and dissociation.

(c) Quantum mechanical demonstration that a major loss of selectivity in closely spaced isotopes when they are subjected to powerful electromagnetic radiation occurs because of the splitting into multiplets of the energy excitation levels taking part in the multiphoton transition, due to induced magnetic dipoles, and which grossly overlap the isotope separation frequency.

(d) Quantum mechanical explanation that any atom or molecule which is a close match to an ideal harmonic oscillator and which is subjected to two perpendicular and identical sets of beams containing frequencies that correspond to the energy levels of the molecular oscillators (or more precisely one set of beams split in two parts which are subsequently crossed perpendicularly) under resonance excitation conditions in a two-photon or multiphoton process, can experience no splitting of the energy levels at all, as a result of the fact that the induced dipoles cancel each other out in an exact and precise manner.

(e) As a consequence of (c) and (d) above an outstanding selectivity is obtained for the Uranium Hexafluoride isotopes under high power excitation conditions, the desired isotope being selected in an exact and precise manner with the unwanted isotope remaining unexcited and rendering an outstanding selective efficiency to the present invention.

(f) The multiphoton dissociation effect requires that in addition to the fundamental frequency of the radiation field matching the first energy excitation level of the molecule, there must exist a higher level in the vibrational ladder whose energy matches the total energy of a group (number) of photons at that frequency. For heavy polyatomic molecules this is nearly always available due to the enormous density of states in the higher vibrational levels (see FIG. 2). This is why dissociation is much easier for heavier polyatomic molecules than for lighter ones. In the context of the present invention for polyatomic molecules there nearly always exists, in addition, a higher level whose energy matches the total energy of a group (number) of photons at the frequency corresponding to the difference between the ground and the second energy excitation level, and so on, rendering the process an even higher selectivity and dissociation yield.

(g) Many other finer details are directly derivable from the previous analysis.

(h) The present invention thus provides very high dissociation yield with outstanding selectivity of the desired $UF_6$ isotope with all being achieved in an extremely small and practical system (see below). The small dimensions of the whole system make it very simple to split one section of the pumping beams and cross the resulting two sets of beams perpendicularly so as to apply the above principles precisely and at will.

In comparing the molecular laser isotope separation process MLIS with the AVLIS process, the degree of selectivity of the former was the only parameter which presented difficulties by comparison with the latter process. As the present invention solves this problem by providing an outstanding degree of selectivity and dissociation in a single step, the MLIS process becomes by far superior to the AVLIS process for the commercial separation of the Uranium isotopes, both from the economic and engineering points of view. The atomic Uranium vapour itself presents formidable engineering tasks in the construction of a production plant. In addition the electron gun atomic vapour source consumes an appreciable electrical energy which on approximate calculations can be estimated to be ~60 $kWh/$SWU i.e. nearly half the running costs of an industrial system. Most of the other engineering problems are caused by the low densities of the Uranium Vapour at which high selectivity can be obtained in the AVLIS process. Good selectivity can be obtained at very low densities $10^{16}$ $atoms/m^3$ (<10 Torr) but this decreases rapidly at higher densities. In practice densities of $10^{19}$ $atoms/m^3$ are regarded as the upper limit for a separation plant, although in practice this figure turns out to be much lower. In reality for an industrial plant there will be many chambers connected in series where four coaxial beams are to be reflected at least 10 times in every chamber. For 40 chambers this would require at least 400 mirrors for each set up. Maintaining the alignment and control of these mirrors for four coaxial beams complicated engineering and electronic controls which must also be protected against the chemically aggressive Uranium vapour. In addition since the vapour expands with a velocity of ~$4\times10^2$ m/s a repetition rate of $10^4$ Hz is required for its full utilization. To maintain the stability of the fine frequency control required for the process for so many interdependent lasers is a difficult task. For a production plant an interaction volume of 200 m in length and 0.05 m in diameter at least will be required, giving a volume of 0.40 $m^3$. To maintain the stability and control of the optical system at this length, beam diameter and repetition rate under the conditions subjected to the corrossiveness of the Uranium atomic vapour is a formidable and expensive engineering task. It is not of concern to the present application to list all the enormous engineering problems in the commercial separation of Uranium isotopes using the AVLIS process.

What is often overlooked, however, is the simplicity of the engineering of the MLIS process due to the much greater density of the $UF_6$ molecules after adiabatic expansion. Consider a small plant having a nozzle 1 m long by 0.01 m deep. A mixture of a noble gas and the $UF_6$ are supercooled by adiabatic expansion through the nozzle to around 50° K. At this temperature approximately 95% of the $UF_6$ molecules are in the lowest vibrational state. In a system with these parameters, after adiabatic expansion velocities of $5\times10^2$ m/s occur, with a $UF_6$ gas density of $10^{22}$ molecules /$m^3$ (more than three to four orders of magnitude higher than the maximum densities available for the AVLIS process). The molecules of $UF_6$ crossing unit volume per second are then $0.01\times5\times10^2\times10^{22}=5\times10^{22}$ molecules /s. The weight of Uranium flowing through the system is then $3.95\times10^{-22}33\times5\times10^{22}=19.75$ gm/s. The weight of Uranium flowing through the system in one year is $3600\times24\times365\times19.75\simeq$ $6.25\times10^5$ kgr/year =625 tons/year. Since 4.3129 kg SWU are needed to produce 1 kgr of 3% $^{235}U$ enriched Uranium from a feed of 5.49 kgr, a system with the above parameters can produce $625\times10^3\times(4.3129/5.49)=485000$ SWU per year This is sufficient for running approximately five 1000 MW(e) nuclear power stations for one year subject to the condition that a high selectivity factor is attained in a single step. The present invention does precisely that. The ease with which the systems based on the schematic arrangements of FIGS. 6a,b can be constructed, is evident.

The laser system described in a very recent patent application provides an extremely versatile, highly efficient source of radiation at the selecting frequency $\omega_1=\omega_0=628.32$ $cm^{-1}$. This system can also provide the other beam corresponding to the second level of the $^{235}UF_6$ at ~1246.1 $cm^{-1}$ very efficiently. A number of other efficient methods exist but the most suitable one for a commercial plant has not yet been assessed since the present invention is the first publication which points out that such a system greatly enhances the MLIS process.

The application of the present invention, shown schematically in FIGS. 8 and 5a for producing an outstanding degree of selectivity at high powers in a single pumping step, in conjunction with the highly versatile and efficient laser source described in a very recent application, makes the Molecular Laser Isotope Separation (MLIS) route by far the most efficient and technologically viable method for the commercial separation of the Uranium isotopes. In fact the two inventions solve the two major problems in the techno-economics of the MLIS method. Application of both inventions to the MLIS route will result to the process being at least two or three orders of magnitude more efficient than was originally anticipated. In table 1 the costs of the different methods for Uranium isotope separation are summarized together with very conservative estimates of the costs to which the MLIS process will be reduced after the present invention together with the recent 16 μm source patent application, are applied. It is evident that the MLIS process becomes by far the most efficient and most effective method for the separation of Uranium isotopes.

Recapitulating, the discovery of a method and the invention of a system which enables an enormous increase in the selectivity and dissociation yield in a single step for the molecular isotope separation process, have been described. In order to selectively excite and dissociate the desired isotope $^{235}UF_6$ the molecular gas is subjected to two collinear beams with frequencies corresponding to the first and second energy excitation levels of that isotope at $\omega_1=\omega_0=$628.32 $cm^{-1}$ and $\omega_2=\omega_0+\omega_{12}\sim1246.1$ $cm^{-1}$ respectively. In order to enhance the selectivity by even larger factors, two such sets of beams—derivable from the same set of collinear beams and polarized in the same direction—are simultaneously applied to the supercooled Uranium Hexafluoride molecular gas crossing each other perpendicularly along the whole of its length. The relative powers of the beams are adjusted for optimum efficiency with all the induced moments of the desired isotope being used for absorption. The selectivity of the desired isotopic species becomes outstanding with a greatly increased dissociation yield the separation process becoming very efficient in a single highly selective step. The MLIS process thus becomes by far the most practical, extremely simple and economic method, both in terms of capital and maintenance costs, for the separation of the Uranium isotopes.

TABLE 1

Comparison of the costs of the various processes for Uranium isotope enrichment, for a standard production plant with a capacity of $8.5 \times 10^6$ Separative Works Units (SWU) per year (compare with the estimates given in: (a) Science, Los Alamos report, Winter/Spring 1982, Vol. 3, No 1; (b) Laser Focus, Sept. 1982 pp 49–54).

| PROCESS | CAPITAL COST | ENERGY REQUIREMENTS | OPERATING COST |
|---|---|---|---|
| Gaseous Diffusion | $500/SWU/yr | 2200 kWh/SWU | 5$/SWU |
| Gas Centrifuge | $500/SWU/yr | 100 kWh/SWU | 15$/SWU |
| AVLIS | $200/SWU/yr | ~100 kWh/SWU | ~5$/SWU |
| MLIS | $100/SWU/yr | ~70 kWh/SWU | ~3$/SWU |
| MLIS (Pat. appl. on 16 μm source + present Pat. appl.) | $10/SWU/yr | ~5 kWh/SWU | ~0.5$/SWU |

The figures in the last row represent costs obtained from very conservative estimates. In practice they can be even lower.

I claim:

1. A method of preferentially exciting and selectively dissociating, in a molecular gas containing molecules of different isotopes, molecules of a desired isotope, in which the gas is irradiated with a first narrow bandwidth laser beam at a frequency $\omega_1$ equal to the frequency $\omega_o$ of the absorption band of the molecules of the desired isotopic species and simultaneously with a second narrow bandwidth laser beam at a frequency $\omega_2$ equal to the frequency $(\omega_o+\omega_{12})$ between the ground state and the second energy excitation level of the molecules of the desired isotopic species, where $\omega_{12}$ is the frequency difference between the first and second energy excitation levels.

2. A highly selective dissociation method as claimed in claim 1 wherein the two beams are collinear and polarized in the same direction.

3. A highly selective dissociation method as claimed in claim 1 wherein in the cases where the absorption bands of the two isotopic species lie very close together and at high pumping powers nonlinear and power broadening effects affect selectivity, the beams are applied to the molecular gas in such a way as to cancel out or avoid such effects for the unwanted isotope hindering selectivity, whilst at the same time exploiting the properties of such effects for the selective absorption of the desired isotopic species.

4. A highly selective dissociation method for molecular laser isotope separation (MLIS) as claimed in claim 1, wherein another set of beams with identical frequencies at $\omega_1=\omega_o$ and $\omega_2=\omega_o+\omega_{12}$ is simultaneously applied to the molecular gas with their electric field vectors parallel to the direction of propagation of the original exciting pumping beams.

5. A highly selective dissociation method for molecular laser isotope separation as claimed in claim 4 wherein the two sets of beams containing the frequencies at $\omega_1=\omega_o$ and $\omega_2=\omega_o=\omega_{12}$ which are crossed perpendicularly at the position of the molecular gas, are derived from the same original set of beams by beamsplitting.

6. A high selectivity dissociation method as claimed in claim 5 wherein the molecules lie within the coherence length of the two sets of beams with their relative timing being adjusted in order to obtain the best possible matching for the interaction, the volume of intersection of the two sets of beams being capable of covering the molecular gas.

7. A highly selective dissociation method for laser isotope separation as claimed in claim 5 wherein the two sets of beams, derivable from the same original set of beams by beamsplitting, are applied to the molecular gas in such a way as to arrive simultaneously at all points within the molecular gas where they cross each other perpendicularly.

8. A highly selective dissociation method for laser isotope separation as claimed in claim 7 wherein the molecular gas simultaneously interacts with two perpendicularly crossed sets of beams, derivable from the same original set of beams by beamsplitting, arriving simultaneously at the points of perpendicular intersection in any optical system which in principle is analogous to a Mach-Zehnder interferometer with the second reuniting beamsplitter removed and the molecular gas placed in its position.

9. A highly selective dissociation method for laser isotope separation as claimed in claim 4 wherein the application of two sets of beams comprising four beams supplies the same energy for absorption to the molecular gas at much less power per beam than in one beam, the relative fluences and powers of the beams capable of being adjusted relative to each other, the two sets of beams being complimentary to each other in the induction and utilization of the dipole and quadrupole moments and wherein a third set of beams may be applied to the system to further facilitate the interaction process.

10. A highly selective dissociation method as claimed in claim 3 wherein all the induced magnetic dipoles involved in the interaction process between the radiation and the molecular transitions at resonance are cancelled out thereby eliminating all energy level splittings and power broadening effects and where in addition full use is made of the absorption due to the induced electric quadrupoles during the interaction process.

11. A high selectivity dissociation method for laser isotope separation as claimed in claim 4 in which two or three of the said beams are applied to the molecular gas.

12. A highly selective dissociation method for Uranium Hexafluoride ($UF_6$) laser isotope separation (MLIS) as claimed in claim 1 and applied to an expansion supercooled Uranium Hexafluoride molecular gas wherein the frequencies of the two beams which are simultaneously applied to the expansion supercooled $UF_6$ gas correspond to the absorption band of the $^{235}UF_6$ gas at $\omega_1=\omega_o=628.31$ cm$^{-1}$ and the other one to the second energy excitation level of the $^{235}UF_6$ at $\omega_2=\omega_o=\omega_{12}$ near 1246.1 cm$^{-1}$.

13. A highly selective dissociation method for Uranium Hexafluoride ($UF_6$) laser isotope separation or any other molecular isotopic species as claimed in claim 12 wherein an additional visible or ultraviolet beam is used to drive the $UF_6$ molecules to their dissociation energy limit of 3 eV (24000 cm$^{-1}$), or where additional infrared beams with frequencies corresponding to the frequencies between the ground and any higher energy excitation level of the molecule are applied with their polarizations in the directions of the induced moments in the molecules thus further enhancing the selectivity and dissociation of the desired isotopic species.

14. A high selectivity dissociation method for Molecular Laser Isotope Separation (MLIS) as claimed in claim 1 wherein the optical pumping arrangement of the interacting beams can be repetitively applied in the direction of expansion of a supercooled molecular gas, each arrangement being fired into the molecular gas with a time delay equivalent to the time taken for the gas to expand from the position of one arrangement to the position of the following arrangement.

15. A highly selective dissociation method for isotope separation as claimed in claim 7, wherein in order to efficiently irradiate the whole of a supercooled molecular gas the points of perpendicular intersections of the two sets of beams within the molecular gas are alternatively moved at new positions for each arrangement along the direction of its expansion for uniform overall interaction with the gas.

16. Apparatus for the selective dissociation, in a molecular gas containing different isotopic species, of molecules of a desired isotopic species, comprising a chamber defining a volume for containing the said gas, and first and second narrow bandwidth lasers, having their laser beams directed collinearly through the chamber, the first laser having a frequency equal to that of the absorption band of the molecules of the desired isotopic species and the second laser having a frequency equal to the frequency between the ground state and the second energy excitation level of the molecules of the desired isotopic species.

17. Apparatus substantially as claimed in claim 16 wherein, in addition, means are provided for deriving from the said lasers respective further beams and directing these through the said volume containing the molecular gas to intersect the first mentioned beams substantially at right angles within the gas.

18. Apparatus for laser isotope separation as claimed in claim 16 wherein an initial set of beams is split in two by a beamsplitter, the resulting two sets of beams being directed through the chamber containing the molecular gas using mirrors to cross each other perpendicularly as they arrive simultaneously at the position of the molecular gas.

19. Apparatus for laser isotope separation as claimed in claim 18 wherein there are two parallel reflectors bracketing the gas, the two sets of split beams being repetitively reflected at 45° to the reflectors crossing each other perpendicularly along the whole length of the molecular gas, arriving simultaneously at all points where they intersect perpendicularly.

20. Apparatus for laser isotope separation as claimed in claim 17 wherein there are two parallel reflectors bracketing the gas, one set of beams travelling parallel to the reflectors whilst the other set of beams is repetitively reflected on the reflectors in a zig-zag configuration crossing the first set of beams substantially at right angles along the whole of the length of the molecular gas.

* * * * *